US012675579B2

(12) United States Patent
Spencer et al.

(10) Patent No.: US 12,675,579 B2
(45) Date of Patent: Jul. 7, 2026

(54) SECURE SYSTEMS OF GUARDRAILS FOR SECURING THE USE OF LARGE LANGUAGE MODELS (LLMs)

(71) Applicant: WitnessAI, Inc., Mountain View, CA (US)

(72) Inventors: Gil Spencer, Incline Village, NV (US); Mathew Solnik, Dallas, TX (US); Tarek Tag, Palo Alto, CA (US); Amr A. Ali, Cairo (EG)

(73) Assignee: WitnessAI, Inc., Mountain View, CA (US)

( * ) Notice: Subject to any disclaimer, the term of this patent is extended or adjusted under 35 U.S.C. 154(b) by 100 days.

(21) Appl. No.: 18/622,686

(22) Filed: Mar. 29, 2024

(65) Prior Publication Data

US 2025/0307418 A1 Oct. 2, 2025

(51) Int. Cl.
*G06F 21/57* (2013.01)
*G06F 21/62* (2013.01)

(52) U.S. Cl.
CPC ........ *G06F 21/577* (2013.01); *G06F 21/6245* (2013.01); *G06F 2221/033* (2013.01)

(58) Field of Classification Search
None
See application file for complete search history.

(56) References Cited

U.S. PATENT DOCUMENTS

| | | |
|---|---|---|
| 12,045,610 B1 | 7/2024 | Myers et al. |
| 12,323,449 B1 | 6/2025 | Graves |
| 12,587,529 B2 | 3/2026 | Solnik et al. |

| | | |
|---|---|---|
| 2007/0289010 A1 | 12/2007 | Thomas et al. |
| 2014/0123325 A1 | 5/2014 | Jung et al. |
| 2020/0372075 A1 | 11/2020 | Rogynskyy et al. |
| 2023/0084202 A1* | 3/2023 | Patil ...................... G16H 30/20 |
| | | 726/26 |
| 2023/0418943 A1 | 12/2023 | Han et al. |
| 2024/0022603 A1 | 1/2024 | Melson et al. |
| 2024/0086567 A1 | 3/2024 | Garg |
| 2024/0205237 A1 | 6/2024 | Tormasov et al. |

(Continued)

*Primary Examiner* — Ali S Abyaneh
*Assistant Examiner* — Felicia Farrow
(74) *Attorney, Agent, or Firm* — Carr & Ferrell LLP; James M. Nachtwey

(57) ABSTRACT

The present disclosure includes computer-implemented methods of guardrails for securely using large language models (LLMs). The method comprises monitoring user data flow using an application programming interface (API) and receiving an administrative policy from an administration communication interface. The method involves dynamically applying a plurality of LLM input inspectors to LLM input data. The application of the plurality of LLM input inspectors is based on the administration policy. The dynamic application of the plurality of LLM input inspectors is in sequence for latency optimization. The plurality of LLM input inspectors serve as LLM input guardrails for a plurality of secure deployed large language models (LLMs). The plurality of LLM input inspectors are configured by the administrative policy and validate the LLM input data to validated LLM input data based on the administration policy. Additionally, the method comprises dynamically applying a plurality of LLM output inspectors to LLM output data.

15 Claims, 15 Drawing Sheets

(56) References Cited

U.S. PATENT DOCUMENTS

| | | | | |
|---|---|---|---|---|
| 2024/0394400 A1* | 11/2024 | Smith | ................. | G06F 21/6227 |
| 2025/0005060 A1* | 1/2025 | Phiri | ................... | G06F 21/6245 |
| 2025/0139367 A1* | 5/2025 | Manandise | .......... | G06F 40/211 |
| 2025/0148308 A1* | 5/2025 | Vinay | .................... | G06F 40/30 |
| 2025/0232190 A1* | 7/2025 | Baughman | .............. | G06N 5/02 |
| 2025/0267171 A1* | 8/2025 | Sharma | ................... | H04L 41/16 |
| 2025/0284805 A1* | 9/2025 | Hen | ...................... | G06F 21/554 |
| 2026/0075055 A1 | 3/2026 | Solnik et al. | | |
| 2026/0135860 A1 | 5/2026 | Spencer et al. | | |

* cited by examiner

100

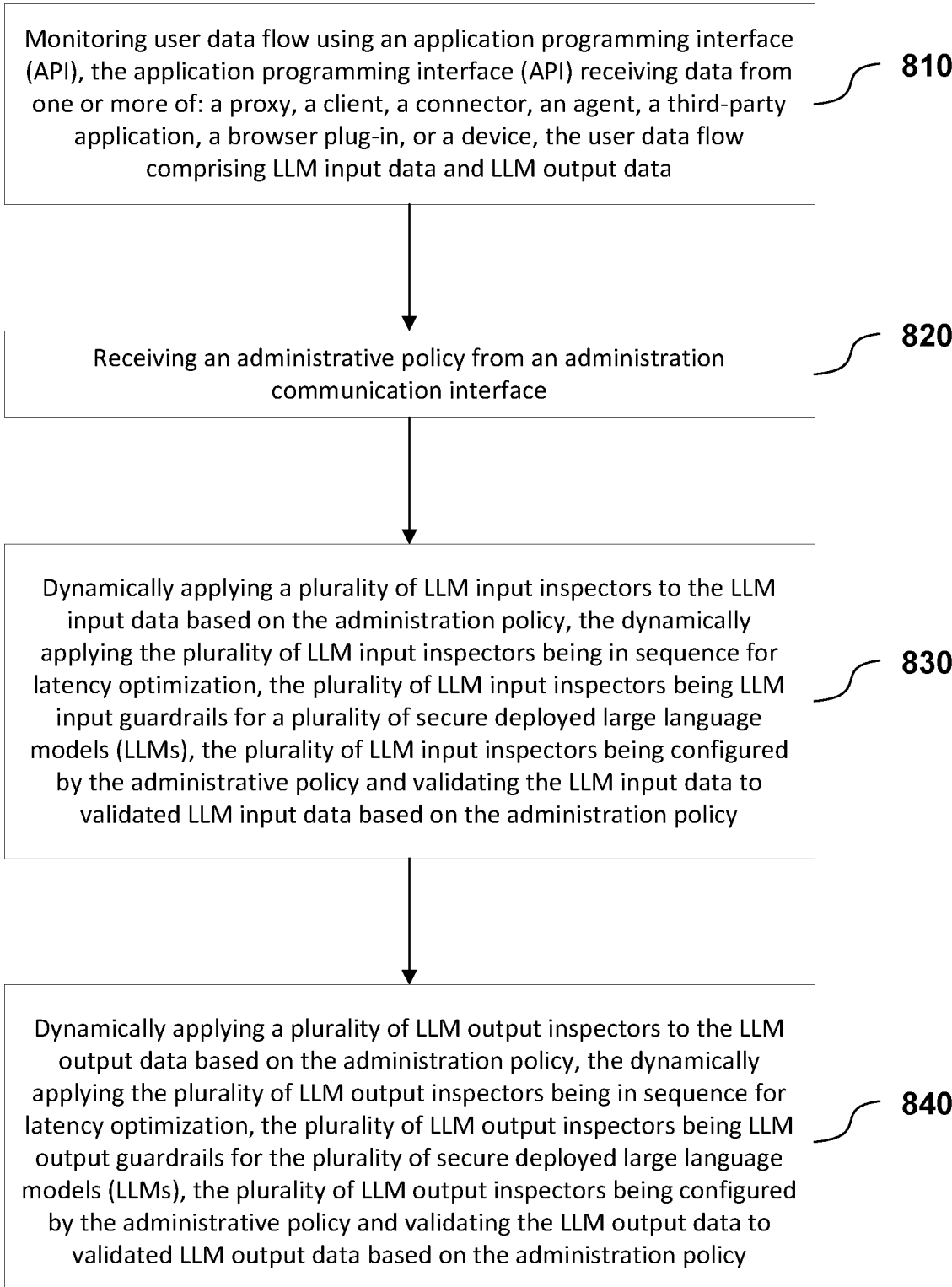

Monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data — 810

Receiving an administrative policy from an administration communication interface — 820

Dynamically applying a plurality of LLM input inspectors to the LLM input data based on the administration policy, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administration policy — 830

Dynamically applying a plurality of LLM output inspectors to the LLM output data based on the administration policy, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administration policy — 840

FIG. 8

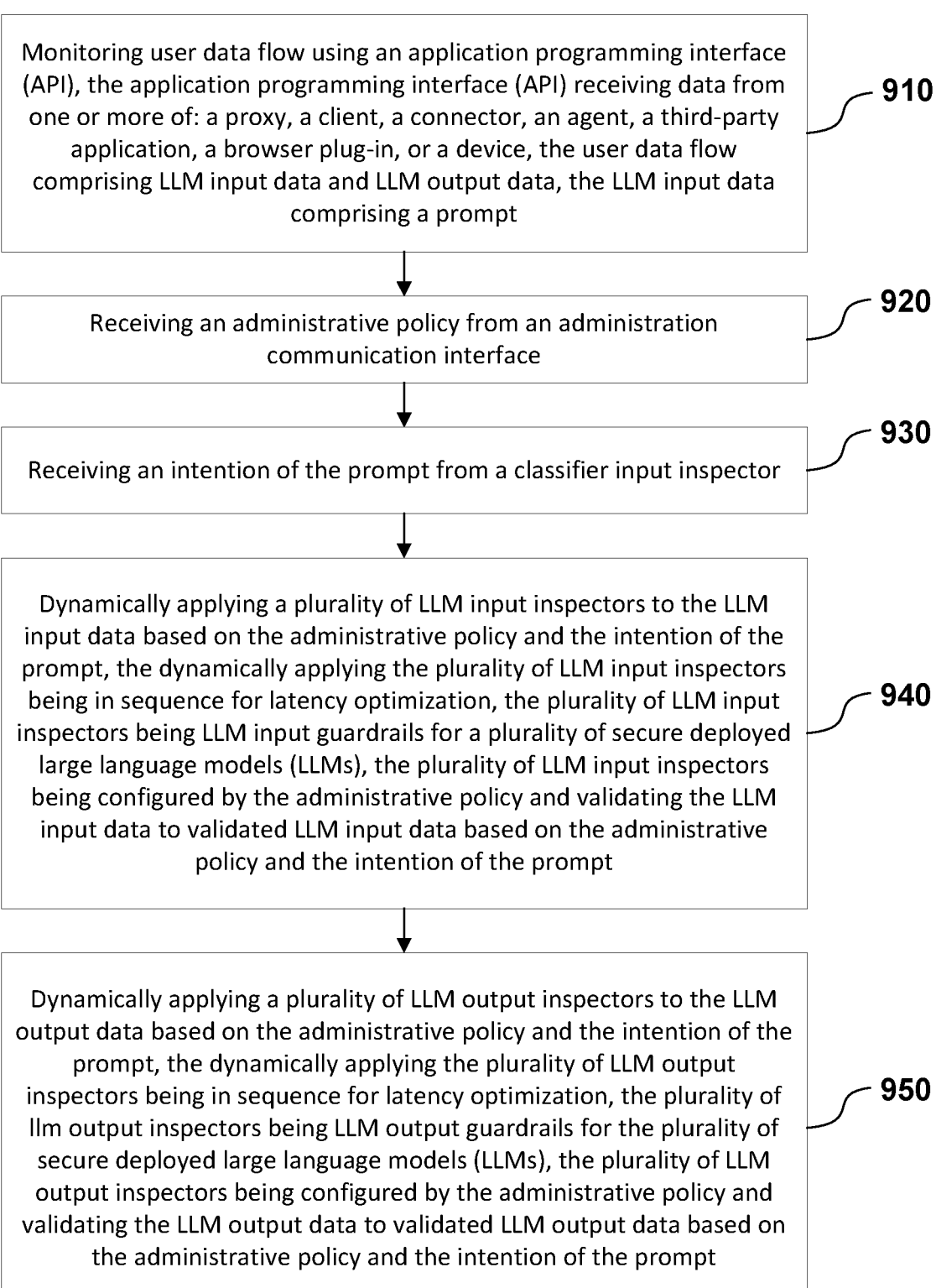

Monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data, the LLM input data comprising a prompt — 910

Receiving an administrative policy from an administration communication interface — 920

Receiving an intention of the prompt from a classifier input inspector — 930

Dynamically applying a plurality of LLM input inspectors to the LLM input data based on the administrative policy and the intention of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt — 940

Dynamically applying a plurality of LLM output inspectors to the LLM output data based on the administrative policy and the intention of the prompt, the dynamically applying the plurality of LLM output inspectors being in sequence for latency optimization, the plurality of llm output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt — 950

FIG. 9

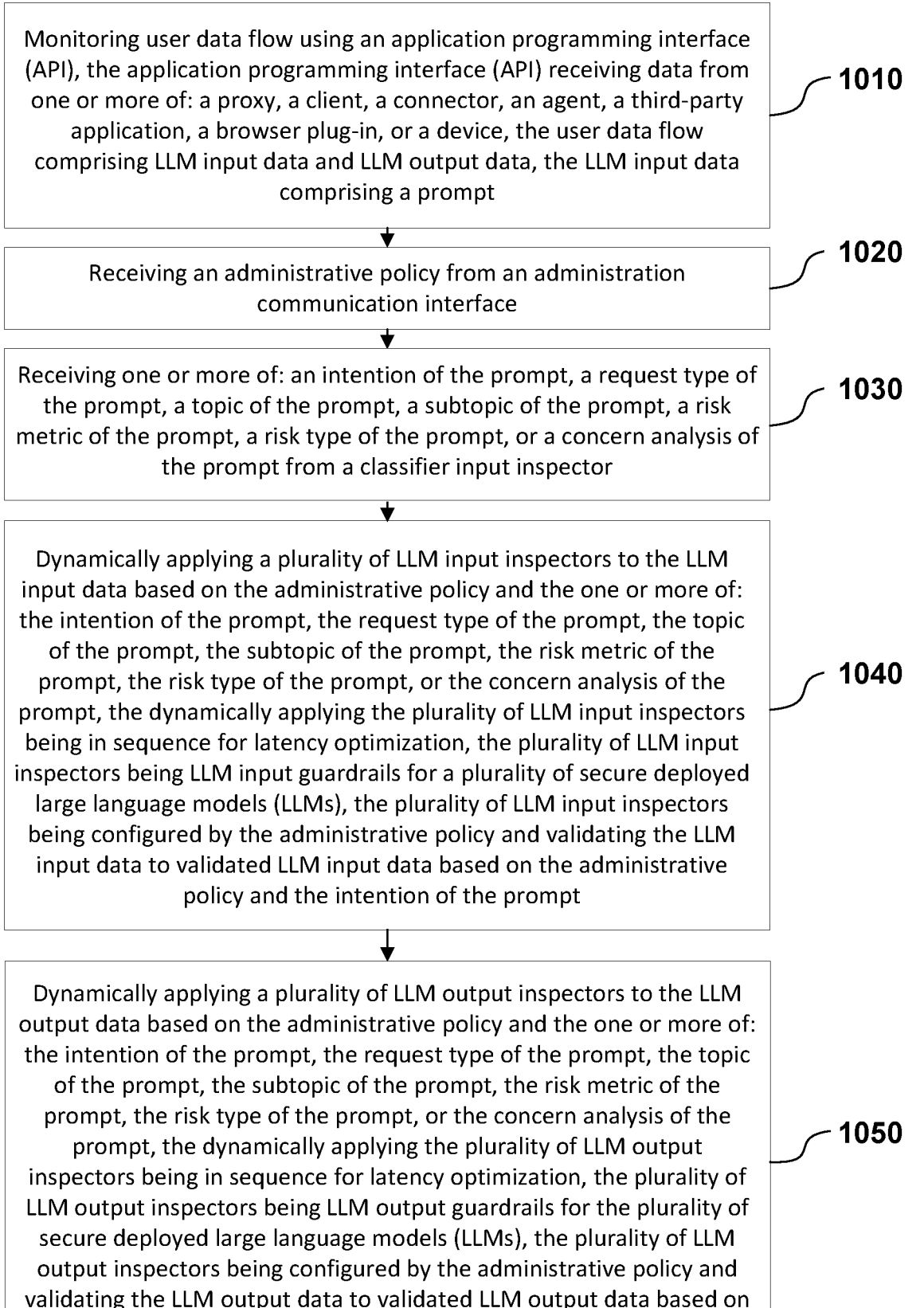

Monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data, the LLM input data comprising a prompt — 1010

Receiving an administrative policy from an administration communication interface — 1020

Receiving one or more of: an intention of the prompt, a request type of the prompt, a topic of the prompt, a subtopic of the prompt, a risk metric of the prompt, a risk type of the prompt, or a concern analysis of the prompt from a classifier input inspector — 1030

Dynamically applying a plurality of LLM input inspectors to the LLM input data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt — 1040

Dynamically applying a plurality of LLM output inspectors to the LLM output data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt — 1050

Figures 11, 11A:
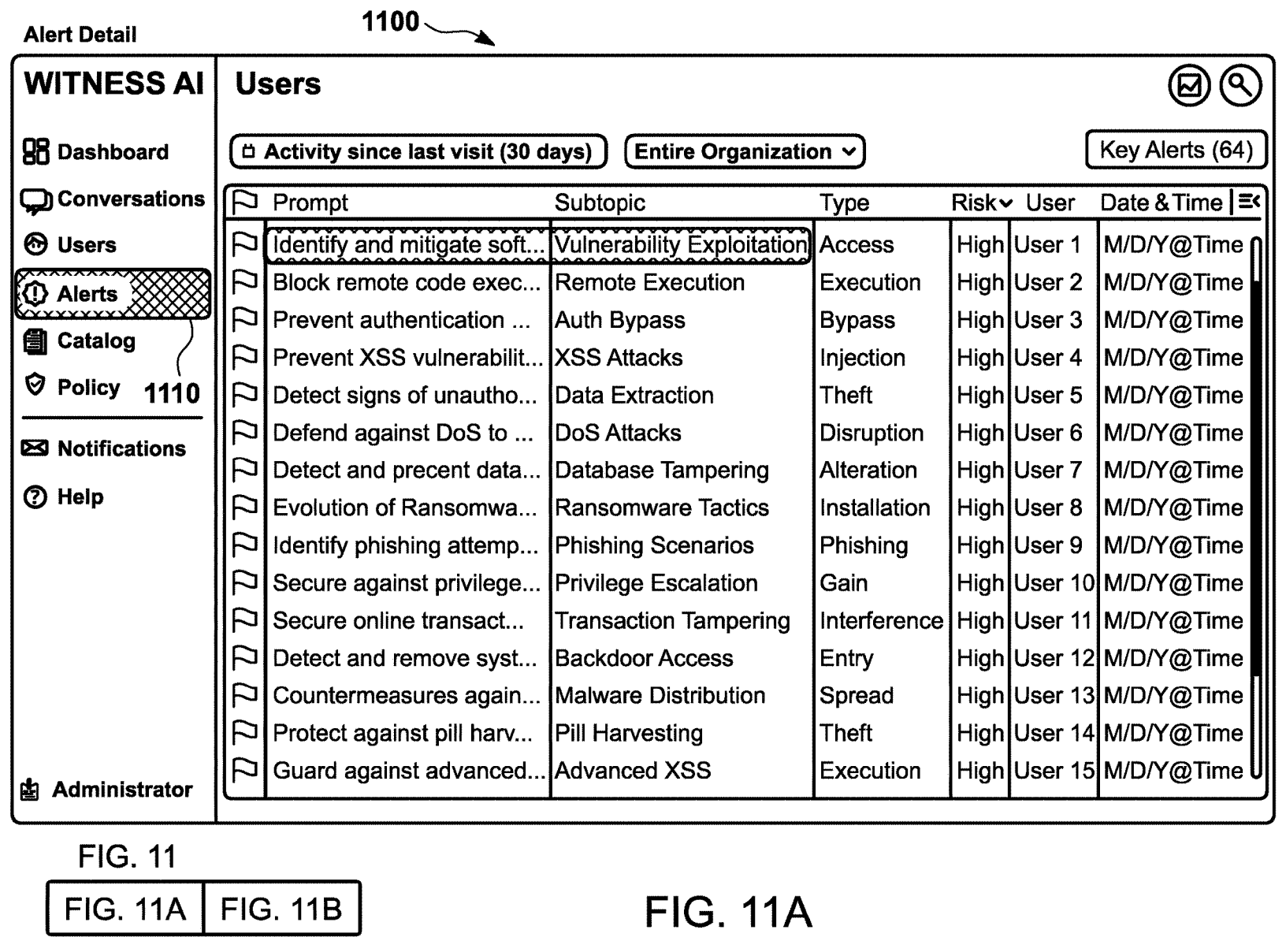

WITNESS AI

Alert Detail

- Dashboard
- Conversations
- Users
- Alerts — 1110
- Catalog
- Policy — 1110
- Notifications
- Help
- Administrator

Users

Activity since last visit (30 days)   Entire Organization ⌄

Key Alerts (64)

| Prompt | Subtopic | Type | Risk⌄ | User | Date & Time |
|---|---|---|---|---|---|
| Identify and mitigate soft... | Vulnerability Exploitation | Access | High | User 1 | M/D/Y@Time |
| Block remote code exec... | Remote Execution | Execution | High | User 2 | M/D/Y@Time |
| Prevent authentication ... | Auth Bypass | Bypass | High | User 3 | M/D/Y@Time |
| Prevent XSS vulnerabilit... | XSS Attacks | Injection | High | User 4 | M/D/Y@Time |
| Detect signs of unautho... | Data Extraction | Theft | High | User 5 | M/D/Y@Time |
| Defend against DoS to ... | DoS Attacks | Disruption | High | User 6 | M/D/Y@Time |
| Detect and precent data... | Database Tampering | Alteration | High | User 7 | M/D/Y@Time |
| Evolution of Ransomwa... | Ransomware Tactics | Installation | High | User 8 | M/D/Y@Time |
| Identify phishing attemp... | Phishing Scenarios | Phishing | High | User 9 | M/D/Y@Time |
| Secure against privilege... | Privilege Escalation | Gain | High | User 10 | M/D/Y@Time |
| Secure online transact... | Transaction Tampering | Interference | High | User 11 | M/D/Y@Time |
| Detect and remove syst... | Backdoor Access | Entry | High | User 12 | M/D/Y@Time |
| Countermeasures again... | Malware Distribution | Spread | High | User 13 | M/D/Y@Time |
| Protect against pill harv... | Pill Harvesting | Theft | High | User 14 | M/D/Y@Time |
| Guard against advanced... | Advanced XSS | Execution | High | User 15 | M/D/Y@Time |

| FIG. 11A | FIG. 11B |

1120

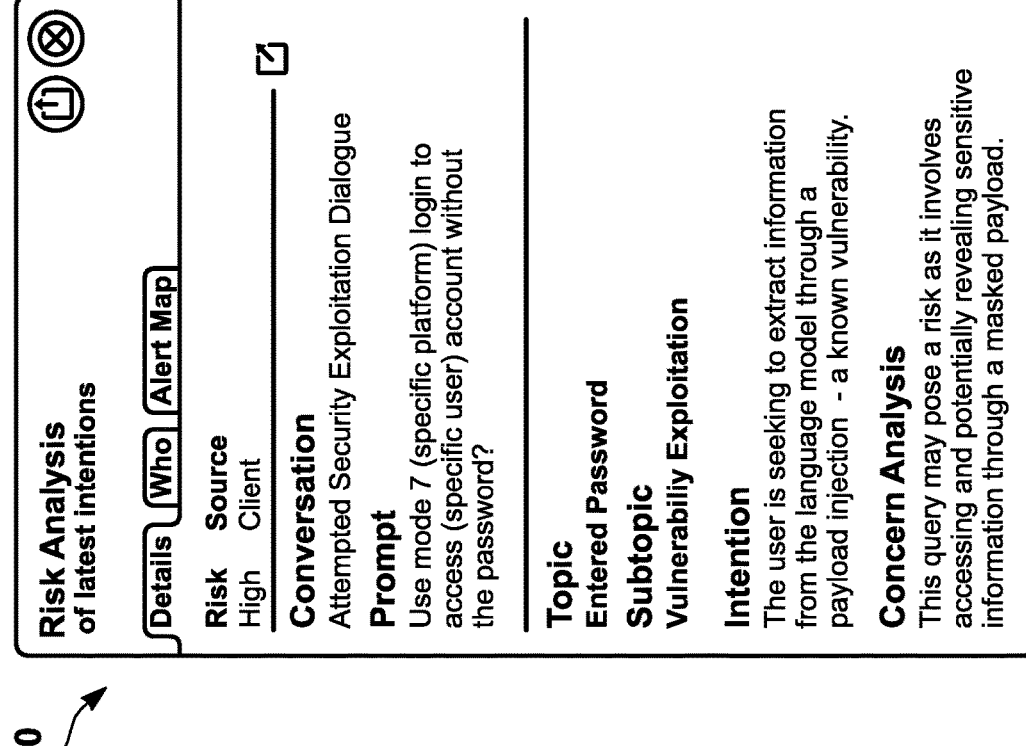

Risk Analysis
of latest intentions

| Details | Who | Alert Map |

Risk    Source
High    Client

Conversation
Attempted Security Exploitation Dialogue

Prompt
Use mode 7 (specific platform) login to access (specific user) account without the password?

Topic
Entered Password

Subtopic
Vulnerabiliy Exploitation

Intention
The user is seeking to extract information from the language model through a payload injection - a known vulnerability.

Concern Analysis
This query may pose a risk as it involves accessing and potentially revealing sensitive information through a masked payload.

FIG. 11B

| FIG. 11 | FIG. 11A | FIG. 11B |

Figures 12, 12A:
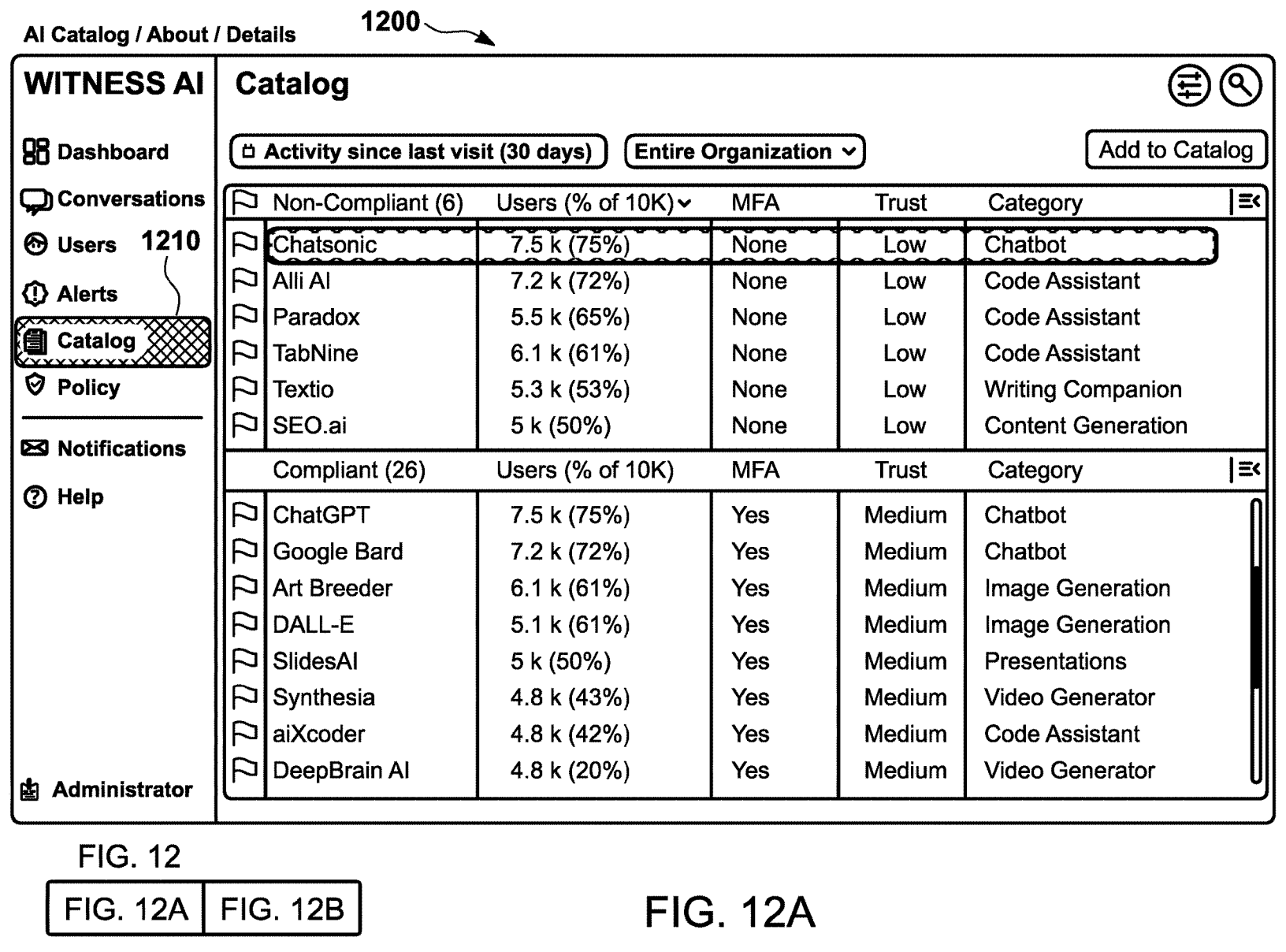

AI Catalog / About / Details

WITNESS AI    Catalog                           Add to Catalog

- Dashboard
- Conversations
- Users   1210
- Alerts
- Catalog
- Policy
- Notifications
- Help

- Administrator

Activity since last visit (30 days)     Entire Organization ⌄

| Non-Compliant (6) | Users (% of 10K) ⌄ | MFA | Trust | Category |
|---|---|---|---|---|
| Chatsonic | 7.5 k (75%) | None | Low | Chatbot |
| Alli AI | 7.2 k (72%) | None | Low | Code Assistant |
| Paradox | 5.5 k (65%) | None | Low | Code Assistant |
| TabNine | 6.1 k (61%) | None | Low | Code Assistant |
| Textio | 5.3 k (53%) | None | Low | Writing Companion |
| SEO.ai | 5 k (50%) | None | Low | Content Generation |

| Compliant (26) | Users (% of 10K) | MFA | Trust | Category |
|---|---|---|---|---|
| ChatGPT | 7.5 k (75%) | Yes | Medium | Chatbot |
| Google Bard | 7.2 k (72%) | Yes | Medium | Chatbot |
| Art Breeder | 6.1 k (61%) | Yes | Medium | Image Generation |
| DALL-E | 5.1 k (61%) | Yes | Medium | Image Generation |
| SlidesAI | 5 k (50%) | Yes | Medium | Presentations |
| Synthesia | 4.8 k (43%) | Yes | Medium | Video Generator |
| aiXcoder | 4.8 k (42%) | Yes | Medium | Code Assistant |
| DeepBrain AI | 4.8 k (20%) | Yes | Medium | Video Generator |

| FIG. 12A | FIG. 12B |
|---|---|

About Chatsonic

| Details | Security Features |

 Chatsonic

A powerful AI chatbot that uses the lastest natural language processing technology to answer questions accurately and informatively. ChatSonic is easy to use, reliable, and secure, making it a great choice for businesses looking to automate customer service interactions.

Status    Alerts    OKTA Support
Online    None    Yes

Supply Chain
Paradox (Code Assistant) - ⊕ Low Trust
ClickUp (Writing Companion) - Medium Trust

Type
Communications

Web
chatsonic.com

OKTA Features
SAML, SWA, Create, Update, Deactivate, Group Push, Schema Discovery, Group Linking, Workflow Templates, Workflows Connectors, Workflows Compatible.

| FIG. 12A | FIG. 12B |

SECURE SYSTEMS OF GUARDRAILS FOR SECURING THE USE OF LARGE LANGUAGE MODELS (LLMs)

FIELD OF THE TECHNOLOGY

Embodiments of the disclosure relate to securely using artificial intelligence (AI). In particular, the present disclosure relates to systems and methods of guardrails for securing the use of large language models (LLMs).

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

The advent of large language models (LLMs) has revolutionized various fields, including natural language processing, machine translation, and text generation. These models, which are typically based on deep learning techniques, have the ability to process and generate human-like text with a high degree of accuracy. However, the use of LLMs also present certain security and privacy challenges. LLMs are trained on large amounts of data, which can include sensitive or private information. When these models are used to process user data, there is a risk that the LLMs may inadvertently reveal or misuse this data. Furthermore, LLMs can be vulnerable to attacks that exploit their underlying training data or model architecture.

To address these issues, various approaches have been proposed. These include techniques for anonymizing or obfuscating the data used in training LLMs, as well as methods for detecting and mitigating attacks on LLMs. However, these approaches often have limitations in terms of their effectiveness, efficiency, or ease of use. Therefore, there is a need for improved techniques for securely using LLMs. Such techniques should be capable of effectively protecting user data and LLMs from unauthorized access, misuse, or attacks. They should also be efficient and easy to implement and use. The present technology addresses these and other needs by dynamically applying a plurality of LLM input inspectors based on administrative policy and an intention of the prompt in some embodiments. Various embodiments further include dynamically applying a plurality of LLM output inspectors based on the administrative policy and the intention of the prompt.

Consequently, the present technology enables the secure use of large language models (LLMs). The present technology enables an enterprise to observe which artificial intelligence (AI) projects are being used and what is specifically being done with the LLMs. Accordingly, users can set policy on the usage of LLMs, and enforce the policy. Accordingly, the present technology protects sensitive data and intellectual property of an enterprise. Significantly, the present technology prevents unwanted sharing of sensitive data including intellectual property with LLMs (i.e., prevents sensitive data including intellectual property from leaving the building).

SUMMARY

According to some embodiments, the present technology is directed to a computer-implemented method of guardrails for securely using large language models (LLMs), the computer-implemented method including: monitoring user data flow using an application programming interface (API), the application programming interface (API) receiving data from one or more of: a proxy, a client, a connector, an agent, a third-party application, a browser plug-in, or a device, the user data flow including LLM input data and LLM output data; receiving an administrative policy from an administration communication interface; dynamically applying a plurality of LLM input inspectors to the LLM input data based on the administrative policy, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy; and dynamically applying a plurality of LLM output inspectors to the LLM output data based on the administrative policy, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy.

Some embodiments relate to a computer-implemented method, wherein the plurality of LLM input inspectors include one or more of: a prompt injection filter, a model drift filter, a Personally Identifiable Information (PII) redacting filter, a banned topics filter, a banned string filter, a bias filter, a source code filter, a toxicity filter, a source tagging filter, a use cases filter, a token count filter, an encryption filter, a security filter, an API filter, or a third-party developed filter.

Some embodiments relate to a computer-implemented method, wherein the plurality of LLM output inspectors include one or more of: a hallucination filter, a prompt injection filter, a malicious URLs filter, a source code filter, a model drift filter, a refutation filter, a Personally Identifiable Information (PII) un-redacting filter, a banned topics filter, an on topic filter, an allowed topics filter, a banned string filter, a bias filter, a toxicity filter, a source tagging filter, a use cases filter, a token count filter, an encryption filter, a relevance filter, an anonymization filter, a sentiment filter, an access control filter, regex filter, a decryption filter, or a third-party developed filter.

Some embodiments relate to a computer-implemented method, analyzing the LLM input data using the plurality of LLM input inspectors; determining the LLM input data violates an LLM input setting of the administrative policy based on the analyzing the LLM input data using the plurality of LLM input inspectors; and blocking the LLM input data from processing by the plurality of secure deployed large language models (LLMs) based on the determining the LLM input data violates the LLM input setting of the administrative policy.

Some embodiments relate to a computer-implemented method, analyzing the LLM output data using the plurality of LLM output inspectors; determining the LLM output data violates an LLM output setting of the administrative policy based on the analyzing the LLM output data using the plurality of LLM output inspectors; and blocking the LLM output data based on the determining the LLM output data violates the LLM output setting of the administrative policy.

Some embodiments relate to a computer-implemented method, wherein the LLM input data includes Personally Identifiable Information (PII); wherein the plurality of LLM input inspectors include a Personally Identifiable Information (PII) filter, the Personally Identifiable Information (PII) filter redacting the Personally Identifiable Information (PII) from processing by the plurality of secure deployed large language models (LLMs) based on the LLM input data including Personally Identifiable Information (PII), the redacting replacing the Personally Identifiable Information (PII) with a tag; and wherein the plurality of LLM output inspectors include a Personally Identifiable Information (PII) un-redacting filter, the Personally Identifiable Information (PII) un-redacting filter un-redacting the Personally Identifiable Information (PII) after the processing of the redacted Personally Identifiable Information (PII) by the plurality of secure deployed large language models (LLMs), the un-redacting replacing the tag with the Personally Identifiable Information (PII).

Some embodiments relate to a computer-implemented method, wherein the LLM input data includes a prompt; wherein the plurality of LLM input inspectors include a classifier input inspector, the classifier input inspector determining an intention of the prompt.

Some embodiments relate to a computer-implemented method, further including: routing the LLM input data to an approved secure deployed large language model (LLM) of the plurality of secure deployed large language models (LLMs) using a routing engine, the routing engine receiving the intention of the prompt and routing the LLM input data to the approved secure deployed large language model (LLM) based on the intention of the prompt.

Some embodiments relate to a computer-implemented method, further including: determining a security risk score for the prompt; comparing the security risk score for the prompt to a security threshold; and performing an action on the LLM input data based on the comparing the security risk score for the prompt to the security threshold.

Some embodiments relate to a computer-implemented method, wherein the performing the action on the LLM input data is blocking the LLM input data for processing by the plurality of secure deployed large language models (LLMs).

Some embodiments relate to a computer-implemented method, wherein the performing the action on the LLM input data is one or more of: generating a warning, logging, or calling a third-party application programming interface (API).

Some embodiments relate to a computer-implemented method, wherein the LLM input data includes confidential information; wherein the plurality of LLM input inspectors include a classifier input inspector, the classifier input inspector determining the LLM input data includes the confidential information; and routing the LLM input data to a private secure deployed large language model (LLM) of the plurality of secure deployed large language models (LLMs) using a routing engine, the routing engine receiving the confidential information and routing the LLM input data to the private secure deployed large language model (LLM).

Some embodiments relate to a computer-implemented method, wherein the LLM input data includes non-confidential information; wherein the plurality of LLM input inspectors include a classifier input inspector, the classifier input inspector determining the LLM input data includes the non-confidential information; and routing the LLM input data to a public deployed large language model (LLM) of the plurality of secure deployed large language models (LLMs)

using a routing engine, the routing engine receiving the non-confidential information and routing the LLM input data to the public deployed large language model (LLM).

Some embodiments relate to a computer-implemented method, wherein the administration communication interface includes a dashboard interface and one or more of: a policy engine, an observability engine, a compliance engine, an audit engine, a best practices engine, a logging engine, a risk scoring engine, a third-party application tracker, a recommendation engine, a reporting engine, or an alert engine.

Some embodiments relate to a computer-implemented method, wherein the plurality of LLM input inspectors include binary input guardrails and modifying input guardrails, the modifying input guardrails changing the LLM input data; wherein the dynamically applying the plurality of LLM input inspectors in sequence is in a linear order, the linear order including first applying the binary input guardrails in parallel and second applying the modifying input guardrails for latency optimization.

Some embodiments relate to a computer-implemented method, wherein the plurality of LLM output inspectors include binary output guardrails and modifying output guardrails, the modifying output guardrails changing the LLM output data; wherein the dynamically applying the plurality of LLM output inspectors in sequence is in a linear order, the linear order including first applying the binary output guardrails in parallel and second applying the modifying output guardrails for latency optimization.

Some embodiments relate to a computer-implemented method, wherein the LLM input data includes a prompt; further including receiving one or more of: an intention of the prompt, a request type of the prompt, a topic of the prompt, a subtopic of the prompt, a risk metric of the prompt, a risk type of the prompt, or a concern analysis of the prompt from a classifier input inspector; wherein the dynamically applying the plurality of LLM input inspectors to the LLM input data is further based on the one or more of: the intention of the prompt, the request type of the prompt, the topic of the prompt, the subtopic of the prompt, the risk metric of the prompt, the risk type of the prompt, or the concern analysis of the prompt.

Some embodiments relate to a computer-implemented method of guardrails for securely using large language models (LLMs), the computer-implemented method including: monitoring user data flow using an application programming interface (API), the application programming interface (API) receiving data from one or more of: a proxy, a client, a connector, an agent, a third-party application, a browser plug-in, or a device, the user data flow including LLM input data and LLM output data, the LLM input data including a prompt; receiving an administrative policy from an administration communication interface; receiving an intention of the prompt from a classifier input inspector; dynamically applying a plurality of LLM input inspectors to the LLM input data based on the administrative policy and the intention of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt; and dynamically applying a plurality of LLM output inspectors to the LLM output data based on the administrative policy and the intention of the prompt, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt.

Some embodiments relate to a computer-implemented method of guardrails for securely using large language models (LLMs), the computer-implemented method including: monitoring user data flow using an application programming interface (API), the application programming interface (API) receiving data from one or more of: a proxy, a client, a connector, an agent, a third-party application, a browser plug-in, or a device, the user data flow including LLM input data and LLM output data, the LLM input data including a prompt; receiving an administrative policy from an administration communication interface; receiving one or more of: an intention of the prompt, a request type of the prompt, a topic of the prompt, a subtopic of the prompt, a risk metric of the prompt, a risk type of the prompt, or a concern analysis of the prompt from a classifier input inspector; dynamically applying a plurality of LLM input inspectors to the LLM input data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt; and dynamically applying a plurality of LLM output inspectors to the LLM output data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt.

Some embodiments relate to a computer-implemented method, further including one or more of: generating a warning, logging, or calling a third-party application programming interface (API) based on the validating the LLM output data.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 8 depicts a process flow diagram showing a method for guardrails for securely using large language models (LLMs) using an administrative policy, according to embodiments of the present technology FIG. 9 depicts a process flow diagram showing a method for guardrails for securely using large language models (LLMs) using an administrative policy and an intention of the prompt, according to embodiments of the present technology.

FIG. 10 depicts a process flow diagram showing a method for guardrails for securely using large language models (LLMs) using an intention of the prompt and a classifier input inspector, according to embodiments of the present technology.

FIG. 11A and FIG. 11B illustrate an exemplary graphical user interface of an exemplary administration communication interface showing risk analysis, according to embodiments of the present technology.

FIG. 12A and FIG. 12B illustrate an exemplary graphical user interface of an exemplary administration communication interface showing logging of Artificial Intelligence (AI) activity, according to embodiments of the present technology.

DETAILED DESCRIPTION

Figure 1:
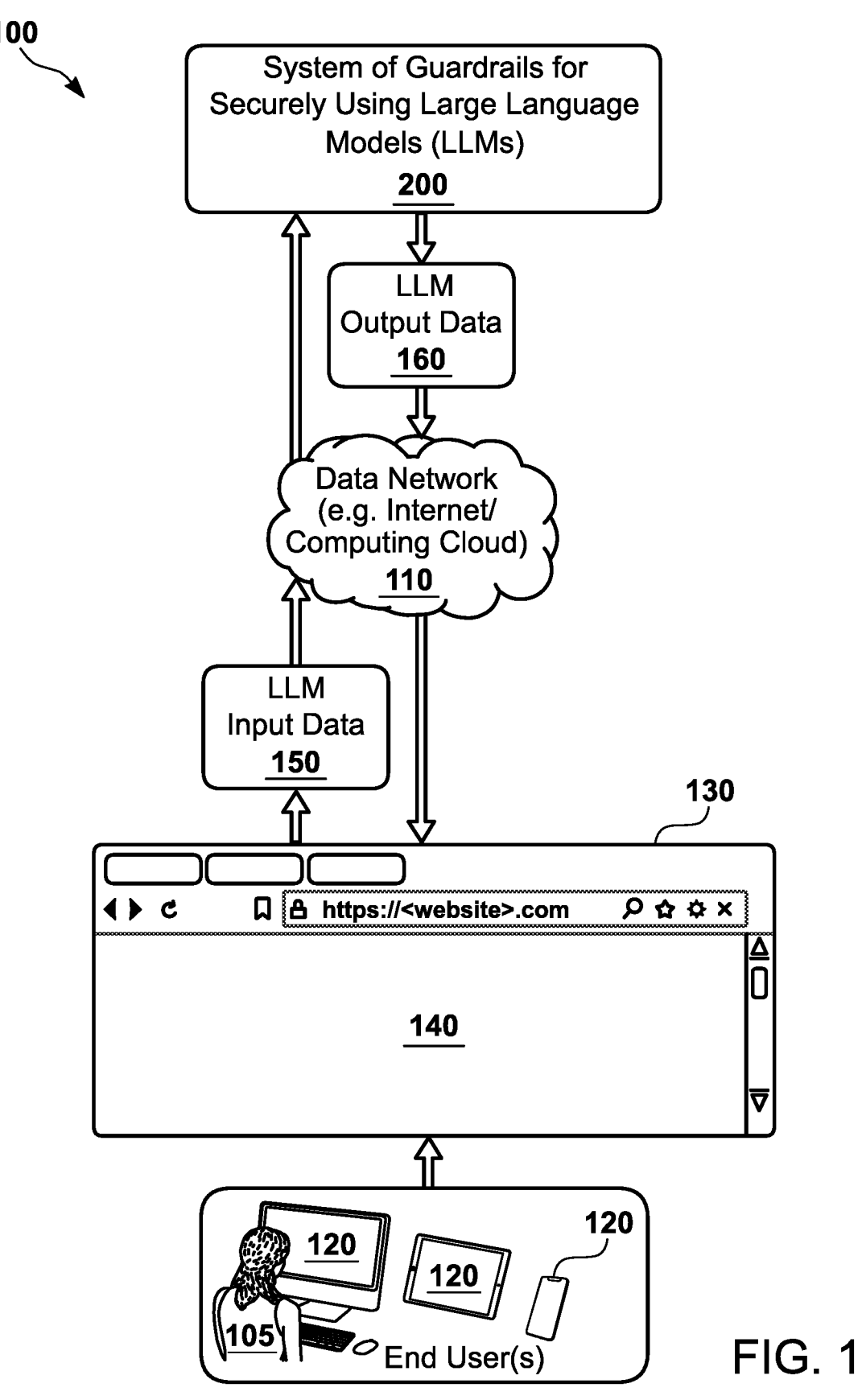
FIG. 1 shows a high-level block diagram of an exemplary environment configured to provide guardrails for securely using large language models (LLMs), according to embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood, that the disclosed embodiments are merely exemplary of the invention, which may be embodied in multiple forms. Those details disclosed herein are not to be interpreted in any form as limiting, but as the basis for the claims.

The present technology makes Artificial Intelligence (AI) safe for the enterprise. Embodiments provide organizations the security and governance controls needed to adopt Artificial Intelligence (AI) safely. Various embodiments sit in the data flow between users and Large Language Models (LLMs), enabling understanding of how Artificial Intelligence (AI) is being used, applying policy, monitoring results, and protecting data, employees, and customers. The present technology provides private and flexible control over using Artificial Intelligence (AI). In various embodiments the present technology is a set of security microservices that are deployed on-premise in the environment of an enterprise, in a cloud sandbox, or a virtual private cloud (VPC). Unlike other Artificial Intelligence (AI) governance solutions, the present technology provides regulatory segregation of data. Furthermore, the present technology enables an understanding of how employees are using Artificial Intelligence (AI).

In various embodiments the present technology enables visualization of which public LLMs and private LLMs employees are using, and provides detailed audit reporting (including supply chain analysis) via existing dashboards or via a personalized console. The present technology enables policy enforcement on data and Artificial Intelligence (AI) usage. Embodiments enforce policies for data and user activity. For example, policy results are logged securely and may be monitored in a secure console or sent to a dashboard of choice of the user. The present technology secures data, people, and systems for an enterprise. For example, embodiments may redact or segregate data to ensure privacy. In some embodiments, data is encrypted in transit and at rest, so that even if a private LLM is attacked, the data is safe.

The present technology pertains to a computer-implemented method of guardrails for securely using large language models (LLMs), thereby making Artificial Intelligence (AI) safe for enterprise use. In various embodiments the present technology is implemented as a set of security microservices that may be deployed on-premise in an enterprise environment, in a cloud sandbox, or a virtual private cloud (VPC). This ensures that data and activity telemetry are segregated from other customers, providing regulatory segregation of data unlike other AI governance solutions.

FIG. 1 shows a high-level block diagram of an exemplary environment configured to provide guardrails for securely using large language models (LLMs), according to embodiments of the present technology. Referring now to the drawings, FIG. 1 illustrates an environment 100 within which systems and methods of guardrails for securely using large language models (LLMs) can be implemented. The environment 100 may include a data network 110 (e.g., an Internet or a computing cloud), end user(s) 105, client device(s) 120 (also referred to herein as user devices) associated with the end user(s) 105 (also referred to herein as users), and a system 200 of guardrails for securely using large language models (LLMs).

Client device(s) 120 may include a personal computer (PC), a desktop computer, a laptop, a smartphone, a tablet, or so forth. The client device 120 may have a user interface 130. Furthermore, a web browser 140 may be running on the client device 120 and displayed using the user interface 130.

The web browser 140 may communicate with the system 200 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (Fire Wire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

In some embodiments the present technology includes a proxy server that sits at the network layer and filters user traffic. The proxy server may receive encrypted data streams and decrypt the data streams for inspecting and filtering. For example, the proxy server enables decrypting of data traffic to enable looking for specific websites (e.g., OpenAI or Microsoft) to which users are sending AI traffic. The proxy server further enables filtering the network protocol to retrieve user prompts into the application network protocol and searching for user prompts. The proxy server could be chained to other proxies or a plug-in to a third-party proxy. Furthermore, a proxy version may be run stand alone on the network, on every end point, server-side, or client side in various embodiments. The present technology enables inspecting and filtering of prompts. For instance, inspection of prompts is important for applications such as Visual Studio or Microsoft Word that have an AI/LLM Co-pilot built in.

In some embodiments, a user may have written a chatbot or an application that uses LLMs. Prompts from the chatbot or application may be similarly inspected and filtered using the present technology by the application using the API. In some instances the present technology provides a client (e.g., a ChatGPT client) that may be pointed by an administrative policy at any LLM of the plurality of secure deployed large language models (LLMs) that run through the API, inspectors, filters, logs, reports, and the like.

Some embodiments include an application catalog. The present technology captures enterprise DNS traffic and looks for AI application usage data. For example, the present technology may enable scanning of thousands of applications and creating a database of these thousands of applications including AI application use. For instance, the AI application use may be reported using the administration communication interface 230 (shown in FIG. 2).

The system 200 may receive LLM input data 150. Based on an administrative policy, the system 200 may dynamically apply a plurality of LLM input inspectors 240 (shown in FIG. 2) to the LLM input data 150. The system 200 may generate LLM output data 160. The system 200 may dynamically apply a plurality of LLM output inspectors 250 to the LLM output data 160 based on the administrative policy (shown in FIG. 2). In various embodiments the present technology is implemented as a set of security microservices that may be deployed on-premise in an enterprise environment, in a cloud sandbox, or a virtual private cloud (VPC). This ensures that data and activity telemetry are segregated from other customers, providing regulatory segregation of data unlike other AI governance solutions.

Figure 2:
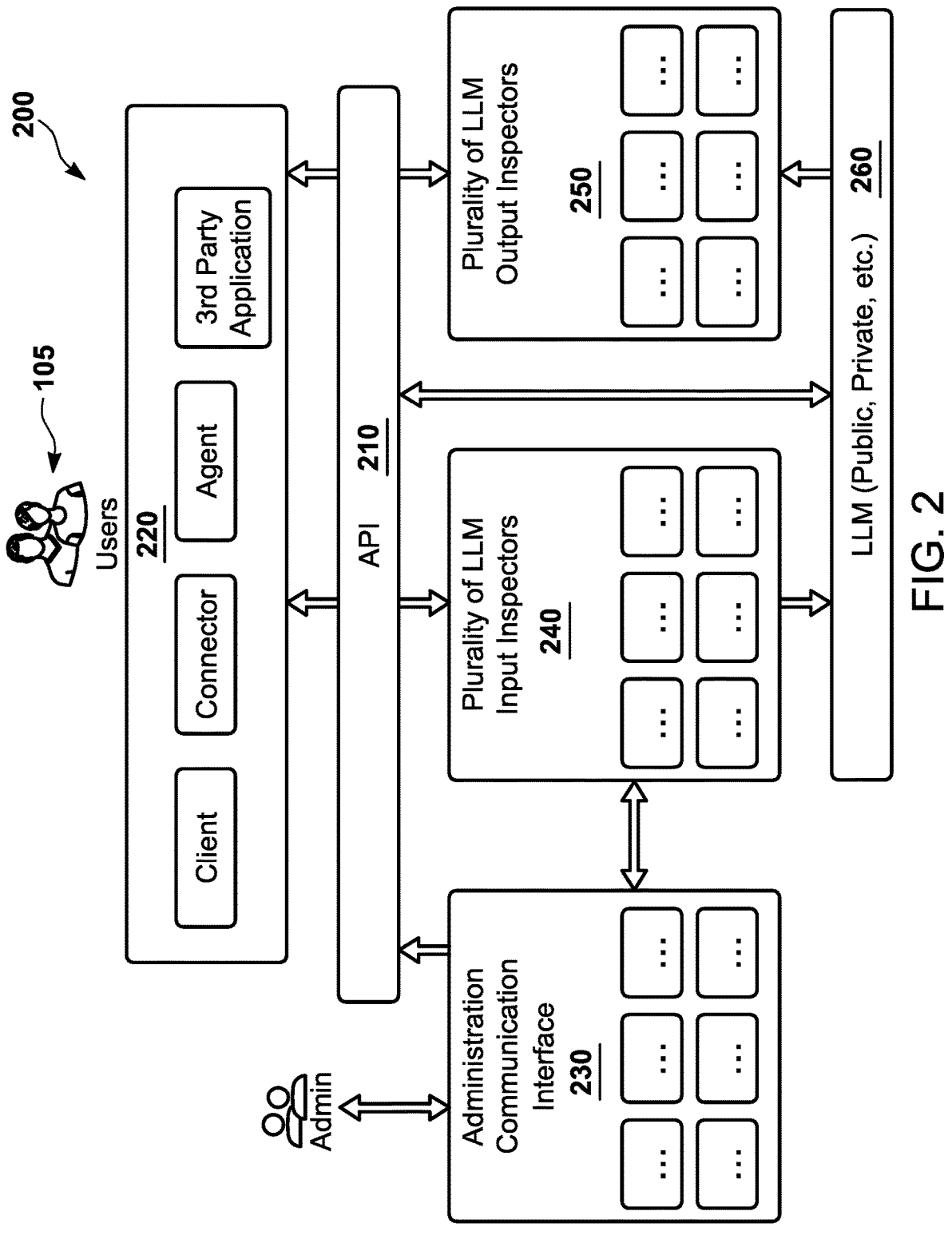
FIG. 2 shows a high-level block diagram of an exemplary system for dynamically applying a plurality of LLM input inspectors and dynamically applying a plurality of LLM output inspectors, according to embodiments of the present technology.

FIG. 2 shows a high-level block diagram of the system 200 for dynamically applying a plurality of LLM input inspectors 240 and dynamically applying a plurality of LLM output inspectors 250, according to embodiments of the present technology. The system 200 includes an application programming interface (API) 210 that receives data from various sources 220, including one or more of: a proxy, a client, a connector, an agent, a third-party application, or a device. The system 200 further includes an administration communication interface 230 that may receive an administrative policy. The system 200 also includes a plurality of LLM input inspectors 240, a plurality of LLM output inspectors 250, and a plurality of secure deployed large language models (LLMs) 260.

Embodiments include monitoring user data flow through an application programming interface (API) 210, which receives data from various sources 220 such as a proxy, client, connector, agent, third-party application, a browser plug-in, or device. The user data flow includes LLM input data 150 and LLM output data 160. Various embodiments include receiving an administrative policy from an administration communication interface 230. This administrative policy may be crucial in understanding how AI is being used within an organization and in enforcing regulations on data and AI usage throughout the organization.

In some embodiments, methods include dynamically applying a series of LLM input inspectors 240 to the LLM input data 150 based on the administrative policy. These LLM input inspectors 240 serve as guardrails for securely deployed LLMs and validate the LLM input data 150 to produce validated LLM input data. In some embodiments, methods include dynamically applying a series of LLM output inspectors 250 to the LLM output data 160 based on the administrative policy. These LLM output inspectors 250 serve as output guardrails for securely deployed LLMs and validate the LLM output data 160 to produce validated LLM output data.

In various embodiments, the present technology enables visualization of which public and private LLMs employees are using and provides detailed audit reporting via existing dashboards or via a personalized console. For example, results of applying the administrative policy to the LLM input data 150 and the LLM output data 160 may be logged securely and also monitored in a secure console or sent to a chosen dashboard of a user.

In some embodiments, the present technology secures data, people, and systems by redacting or segregating data to ensure privacy. Data is encrypted both in transit and at rest, ensuring safety even in the event of an attack on a private LLM. For example, the plurality of LLM input inspectors 240 may include the examples. An anomaly detector may flag any unusual patterns or outliers in the LLM input data 150, helping to identify potential security threats or errors before they reach the LLM. For example, a data anonymizer may strip any personally identifiable information from the LLM input data 150 to protect user privacy and comply with data protection regulations.

In some embodiments, the plurality of LLM output inspectors 250 may include content filters and sentiment analyzers. For instance, a content filter may screen the LLM output data 160 for sensitive information or inappropriate content, ensuring that confidential data is not leaked or inappropriate responses are generated. A sentiment analyzer may assess the emotional tone of the LLM output data 160 to prevent the dissemination of harmful or offensive messages.

In some embodiments, the administrative policy may be dynamically updated based on real-time feedback from the LLM input inspectors 240 and the LLM output inspectors 250. For example, if an LLM input inspector consistently flags certain types of data as suspicious, the administrative policy may be adjusted to automatically block or quarantine such data in the future. Similarly, if an LLM output inspector detects a pattern of undesirable responses, the administrative policy may trigger corrective actions, such as generating a warning, observing, logging, blocking, or calling a third-party application programming interface (API). Accordingly, the present technology includes dynamically applying a plurality of LLM input inspectors 240 to the LLM input data 150 based on the administrative policy and dynamically applying a plurality of LLM output inspectors 250 to the LLM output data 160 based on the administrative policy. Moreover, the administrative policy may be customized for different user roles or data sensitivity levels. For example, role-based access control (RBAC) for LLMs. For instance, certain users or applications may require stricter LLM input inspectors 240 and LLM output inspections based on the nature of their interactions with the large language model (LLM). By tailoring the administrative policy to specific use cases, organizations can enhance security measures and ensure compliance with industry regulations.

In various embodiments, methods comprise a plurality of LLM input inspectors 240. These LLM input inspectors 240 may comprise one or more of the following: a prompt injection filter, a model drift filter, a Personally Identifiable Information (PII) redacting filter, a banned topics filter, a banned string filter, a bias filter, a source code filter, a toxicity filter, a source tagging filter, a use cases filter, a token count filter, an encryption filter, or a third-party developed filter. For example, the prompt injection filter is designed to detect and prevent any unauthorized injection of prompts into the LLM input data 150, ensuring that the model processes only legitimate prompts provided by authorized users or systems. For example, the prompt injection filter may analyze the structure and content of the input data to identify any anomalies that could indicate the presence of security attacks embedded in prompts. In some embodiments the plurality of LLM input inspectors 240 include a generic security filter that learns and secures against malicious threats. Various embodiments include an API filter that checks the parameters of APIs that an LLM calls.

In various embodiments, the computer-implemented methods comprise a plurality of LLM output inspectors 250. These inspectors may comprise one or more of the following: a hallucination filter, a prompt injection filter, a malicious URLs filter, a source code filter, a model drift filter, a refutation filter, a Personally Identifiable Information (PII) un-redacting filter, a banned topics filter, an on topic filter, an allowed topics filter, a banned string filter, a bias filter, a toxicity filter, a source tagging filter, a use cases filter, a token count filter, an encryption filter, a relevance filter, an anonymization filter, a sentiment filter, an access control filter, regex filter, a decryption filter, or a third-party developed filter.

According to various embodiments, the hallucination filter is designed to detect and filter out any generated text that contains unrealistic or improbable content that is not based in reality and is made-up. For example, if the LLM is being used to generate news articles, the hallucination filter can identify and remove any text that includes fantastical elements or events that are not based on factual information. Additionally, the plurality of LLM output inspectors 250 may include a malicious URL filter. The malicious URL filter is designed to scan the LLM output data 160 for any embedded URLs that could potentially lead to malicious websites or harmful content. By detecting and removing such URLs, the malicious URLs filter helps prevent users from being exposed to security risks or phishing attacks when interacting with the generated text. Furthermore, the model drift filter is another inspector that can be one of the plurality of LLM output inspectors 250. The model drift filter monitors the LLM output data 160 for any signs of model degradation or drift, where the LLM starts producing inaccurate or outdated information. By identifying and flagging instances of model drift, the model drift filter enables proactive maintenance and updates to ensure the continued reliability and performance of an LLM.

In an alternative embodiment, the plurality of LLM output inspectors 250 may include a sentiment filter. The sentiment filter analyzes the emotional tone or sentiment conveyed in the LLM output data 160 (e.g., text). The sentiment filter can detect and classify the sentiment as positive, negative, or neutral, providing valuable insights for applications such as sentiment analysis, social media monitoring, or customer feedback analysis. By incorporating the sentiment filter, users can better understand the emotional context of the generated content and tailor their responses accordingly.

Another variation of the LLM input inspectors 240 could include a data integrity verification filter. This filter is responsible for ensuring the integrity and authenticity of the input data before it is processed by the secure deployed large language models (LLMs) 260. The data integrity verification filter may employ cryptographic hashing algorithms, checksums, or digital signatures to verify that the input data has not been tampered with or altered during transit. By confirming the integrity of the input data, the filter enhances the security and reliability of the LLM processing pipeline, reducing the risk of malicious attacks or data corruption.

According to embodiments, the computer-implemented method includes analyzing the LLM input data 150 using a plurality of LLM input inspectors 240. The method further may comprise determining whether the LLM input data 150 violates an LLM input setting of the administrative policy. This determination is based on the analysis of the LLM input data 150 using the plurality of LLM input inspectors 240 and dynamically applying a plurality of LLM input inspectors 240 by adjusting of the LLM input setting.

Some embodiments include blocking the LLM input data 150 from processing by the plurality of secure deployed large language models (LLMs) 260. This blocking action is based on the determination that the LLM input data 150 violates the LLM input setting of the administrative policy. These inspectors are designed to scrutinize the LLM input data 150 and ensure the LLM input data 150 complies with the specified administrative policy and LLM input settings.

For instance, one type of LLM input inspector may focus on checking the format of the LLM input data 150, while another may verify the source of the LLM input data 150. By employing a range of inspectors, the present technology may comprehensively assess the LLM input data 150 for any inconsistencies or violations of the administrative policy and LLM input settings. For example, the administrative policy may trigger corrective actions, such as generating a warning, observing, logging, blocking, or calling a third-party application programming interface (API).

In various embodiments, upon completion of the analysis, the method proceeds to determine whether the LLM input data 150 adheres to the LLM input setting outlined in the administrative policy. This determination is in maintaining the security and integrity of the large language models (LLMs) being utilized. For example, if the analysis reveals that the LLM input data 150 violates the specified setting, the method initiates a blocking action. This action prevents the non-compliant data from being processed by the secure deployed LLMs, thereby mitigating potential risks or unauthorized usage scenarios. For example, consider a scenario where an organization has implemented a policy that restricts the use of certain sensitive keywords in the LLM input data 150 provided to the LLMs. The LLM input inspectors 240 may scan the incoming data, flag any instances of the restricted keywords, and trigger the blocking mechanism to prevent such data from being processed by the LLMs. This proactive approach helps enforce the organization's data governance policies and ensures that only compliant data is utilized by the LLMs.

In some embodiments, the computer-implemented method involves analyzing the LLM output data 160. This analysis is performed using the plurality of LLM output inspectors 250. The method further may comprise determining whether the LLM output data 160 violates an LLM output setting of the administrative policy. This determination is based on the analysis of the LLM output data 160 using the plurality of LLM output inspectors 250. Some embodiments include blocking the LLM output data 160. The blocking of the LLM output data 160 is based on the determination that the LLM output data 160 violates the LLM output setting of the administrative policy. For example, the LLM output inspectors 250 may check for sensitive information leakage, inappropriate language, or any other predefined criteria set in the administrative policy. To illustrate, consider a scenario where a large language model (LLM) is used for generating responses to customer queries in a customer service chatbot application. The LLM output inspectors 250, based on the administrative policy, are configured to ensure that the responses generated do not contain any confidential customer information such as credit card numbers or personal addresses. If during the analysis, an LLM output inspector detects such sensitive information in the output data, it triggers a violation of the LLM output setting in the administrative policy. Subsequently, upon determining that the LLM output data 160 violates the LLM output setting of the administrative policy, the present technology blocks the LLM output data 160 from being transmitted to the end-user or client application. This blocking mechanism prevents the dissemination of unauthorized or sensitive information and helps maintain data security and compliance with regulatory requirements.

In various embodiments, instead of outright blocking the LLM output data 160, the present technology may involve masking or redacting the specific sensitive information detected by the LLM output inspectors 250. This approach allows a portion of the LLM output data 160 to be delivered while ensuring that only the problematic content is withheld or modified before reaching the end-user. In another variation, the present technology may include generating real-time alerts or notifications to the system administrators or designated personnel when a violation of the LLM output setting of the administrative policy occurs. These alerts can provide immediate visibility into the issue, enabling prompt investigation and remediation to address the compliance breach effectively.

In some embodiments, the method may include a plurality of LLM input inspectors 240. These inspectors comprise a Personally Identifiable Information (PII) filter. The purpose of the Personally Identifiable Information (PII) filter is to redact the Personally Identifiable Information (PII) from processing by the plurality of secure deployed large language models (LLMs) 260. For example, the LLM input data 150 may comprise Personally Identifiable Information (PII) of a user such as a social security number of a user or credit card number of a user, just to name a few. The redaction of the social security number of a user by the Personally Identifiable Information (PII) filter is based on the LLM input data 150, which may comprise Personally Identifiable Information (PII). The redacting process involves replacing the Personally Identifiable Information (PII) (e.g., security number of a user or credit card number of a user) with a tag, thus, the Personally Identifiable Information (PII) is not provided to an LLM. Furthermore, the computer-implemented method may comprise a plurality of LLM output inspectors 250. These inspectors include a Personally Identifiable Information (PII) un-redacting filter. The purpose of this filter is to un-redact the Personally Identifiable Information (PII) after the processing of the redacted Personally Identifiable Information (PII) by the plurality of secure deployed large language models (LLMs) 260. The un-redacting process involves replacing the tag with the Personally Identifiable Information (PII). For example, the tag may be replaced with the security number of a user or the credit card number of a user, just to name a few. For instance, in a scenario where a user provides personal details such as their name, address, and contact information as LLM input data 150, the information can be tagged before being processed by the large language models (LLMs). This tagging process ensures that the original data is protected while still allowing the models to perform their intended functions without compromising user privacy.

In some embodiments, the LLM output inspectors 250 include a sentiment analysis filter. The sentiment analysis filter is configured to assess the emotional tone or sentiment conveyed in the output data generated by secure deployed large language models (LLMs) 260. By analyzing the sentiment of the output, potential issues such as offensive language, inappropriate content, or negative connotations can be identified and flagged for review. The sentiment analysis filter may utilize natural language processing techniques to classify the tone of the text as positive, negative, or neutral. Depending on the results, the sentiment analysis filter may trigger actions such as content moderation, alert notifications, or feedback loops to improve the quality of the LLM output.

In various embodiments, the present technology includes the use of LLM input data 150 comprising a prompt. The applying of a plurality of LLM input inspectors 240 may comprise a classifier input inspector. The classifier input inspector is responsible for determining an intention of the prompt. The classifier input inspector plays a role in determining the intention behind the prompt provided as input to the large language model (LLM). The classifier input inspector utilizes advanced machine learning algorithms to analyze the prompt and classify it into specific categories or intentions. For example, if the prompt is related to a question, the classifier input inspector would categorize it as a query intention. Similarly, if the prompt indicates a command, the classifier input inspector would classify it accordingly. Accordingly, the classifier input inspector analyzes the prompt and classifies the prompt. This classification is essential for ensuring that the LLM processes the input accurately and generates the desired output in some embodiments.

To illustrate this process, consider a first example: "request_type": "Information search", "topic": "Passwords", "subtopic": "Retrieval", "intention": "The user is seeking to find and review previous passwords."

To further illustrate this process, consider a second example: "request_type": "Information search", "topic": "Mathematics", "subtopic": "Square root", "intention": "The user is seeking the answer to a mathematical question". In some instances, a "topic": "Mathematics", may be normalized so that the topic may be counted (e.g., eight different uses of "Mathematics").

The present technology may further comprise the step of routing the LLM input data 150. The routing of the LLM input data 150 is directed towards an approved secure deployed large language model (LLM) from the plurality of secure deployed large language models (LLMs) 260. This routing is facilitated by a routing engine. The routing engine receives the intention of the prompt and based on this intention, routes the LLM input data 150 to the approved secure deployed large language model (LLM). The machine learning algorithms analyze various factors such as the content of the LLM input data 150, historical usage patterns, and the specific requirements of the prompt to make an informed decision on routing. For example, consider a scenario where a user inputs a complex contract question into the system. The routing engine, through its machine learning capabilities, recognizes the specialized nature of the query and directs the LLM input data 150 to an approved secure deployed large language model (LLM) that is trained specifically for contract drafting processing. This ensures that the output generated by the LLM is accurate and relevant to the needs of the user.

According to some embodiments, the routing engine can prioritize certain LLMs of the secure deployed large language models (LLMs) 260 over others based on factors such as computational resources availability, response time requirements, or specific user preferences. This dynamic routing capability ensures efficient utilization of resources and optimal performance of the system in handling diverse types of LLM input data 150.

In various embodiments, the present technology includes determining a security risk score for the prompt. For example, the risk score may be generated by dynamically applying the plurality of LLM input inspectors 240 and dynamically applying the plurality of LLM output inspectors. In addition, methods may include comparing the security risk score for the prompt to a security threshold and performing an action on the LLM input data. For example, the action is based on the comparison of the security risk score for the prompt to the security threshold. For example, the security risk score could be calculated based on the reputation of the source sending the prompt, the complexity of the language used in the prompt, and the frequency of prompts from the same source. Once the security risk score for the prompt is determined, it can be compared to a predefined security threshold to assess the level of risk associated with the prompt. For instance, if the security risk score exceeds the security threshold, it may indicate a higher likelihood of malicious intent or data security breach. On the other hand, if the security risk score is below the threshold, the prompt may be considered safe for processing without further intervention. The present technology works in multiple languages.

Accordingly, the present technology protects sensitive data and intellectual property of the enterprise. Significantly, the present technology prevents unwanted sharing of sensitive data including intellectual property with LLMs (i.e., prevents sensitive data including intellectual property from leaving the building).

To illustrate this process, consider the first example: "request_type": "Information search", "topic": "Passwords", "subtopic": "Retrieval", "intention": "The user is seeking to find and review previous passwords.". "risk_metric": "Medium", "risk_type": "Data Leakage", "concern_analysis": "This query may pose a risk as it involves accessing and potentially revealing sensitive information."

In contrast, to further illustrate this process, consider the second example: "request_type": "Information search", "topic": "Mathematics", "subtopic": "Square root", "intention": "The user is seeking the answer to a mathematical question". "risk_metric": "None", "risk_type": "None", "concern_analysis": "No concerns detected".

In various embodiments, based on the comparison result between the security risk score and the security threshold, an appropriate action can be taken on the LLM input data 150. This action could vary depending on the specific security policies in place and the nature of the prompt. For example, if the security risk score is above the threshold, the LLM input data 150 may be subjected to additional scrutiny or validation processes before being processed by the large language model. For instance, the analysis may be "This query may pose a risk as it involves accessing and potentially revealing sensitive information." Conversely, if the security risk score is below the threshold, the LLM input data 150 may proceed for processing without any additional checks. For instance, the analysis may be "concern_analysis": "No concerns detected".

In various embodiments, the action taken on the LLM input data 150 based on the comparison result may be customized according to the specific requirements of the system or organization implementing the method. For instance, in a financial services environment, a high-security risk score for a prompt related to financial transactions may trigger an immediate alert to security personnel for further investigation, while a low-security risk score for a general inquiry prompt may allow for seamless processing without delays.

In some embodiments, the computer-implemented method includes performing an action on the LLM input data 150. The nature of this action may be blocking the LLM input data 150. The purpose of blocking the LLM input data 150 is to prevent processing by the plurality of secure deployed large language models (LLMs) 260.

In some embodiments, the present technology may comprise performing an action on the LLM input data 150. The action performed on the LLM input data 150 may be one or more of the following: generating a warning, alerting, logging, or calling a third-party application programming interface (API). These actions are for ensuring that the LLM input data is thoroughly inspected and validated before being processed further. One specific action that can be performed on the LLM input data 150 is generating a warning. When certain anomalies or potential security risks are detected in the LLM input data 150 by the plurality of LLM input inspectors 240, a warning can be generated to alert the system administrators or users about the issue. This warning can provide details about the nature of the problem detected, allowing for timely intervention to address the issue and prevent any adverse consequences.

In various embodiments, another action that can be taken on the LLM input data 150 is logging. Logging involves recording detailed information about the LLM input data 150, the inspection process, and any actions taken by the plurality of LLM input inspectors 240. This logged data can be valuable for auditing, analysis, and troubleshooting purposes. This logged data can help in identifying patterns, trends, or irregularities in the LLM input data 150 flow, enabling continuous improvement of the security measures in place.

In some embodiments, the method allows for calling a third-party application programming interface (API) as an action on the LLM input data 150. In certain scenarios where specialized analysis or processing of the LLM input data 150 is required, a third-party API can be invoked to perform specific tasks. This external API integration expands the functionality and capabilities of the system, enabling seamless interaction with external services or tools for enhanced security and efficiency. Furthermore, it is worth noting that the actions performed on the LLM input data 150 can be customized and extended based on the specific requirements of the application or system utilizing the large language models (LLMs). Alternative actions such as blocking certain data inputs, triggering automated responses, or applying advanced data transformation techniques may be integrated into the method to further strengthen the guardrails for securely using large language models (LLMs).

Some embodiments involve the LLM input data 150 comprising confidential information. For example, the plurality of LLM input inspectors 240 may include a classifier input inspector. The classifier input inspector is responsible for determining whether the LLM input data 150 may comprise the confidential information. Furthermore, the method may comprise routing the LLM input data 150. This routing may be to a private secure deployed large language model (LLM) based on determining that the LLM input data 150 comprises the confidential information. The routing of the LLM input data 150 to the private secure deployed large language model (LLM) is facilitated by a routing engine. The routing engine receives the confidential information and is responsible for routing the LLM input data 150 to the private secure deployed large language model (LLM). For example, the classifier input inspector may employ natural language processing techniques to identify sensitive keywords or patterns within the input data that indicate the presence of confidential information. Upon detection of such information, the classifier input inspector flags the data for further processing according to the administrative policy.

In some embodiments, the routing engine utilizes a secure communication protocol to transmit the LLM input data 150 to the private secure deployed large language model (LLM). The secure communication protocol may involve encryption mechanisms to ensure the confidentiality and integrity of the data during transit. Additionally, the routing engine may implement access control mechanisms to restrict unauthorized access to the LLM input data 150 while it is being routed to the private secure deployed large language model (LLM).

In various embodiments, the routing process may involve the use of a distributed network architecture. In this scenario, the LLM input data 150 is distributed across multiple nodes within the network, with each node responsible for processing a subset of the data. The routing engine coordinates the distribution of the data and ensures that each node receives the relevant information required for processing. This distributed approach can enhance scalability and fault tolerance in handling large volumes of LLM input data 150. Furthermore, the routing engine may implement load balancing algorithms to optimize the distribution of LLM input data 150 among the secure deployed large language models (LLMs) 260. By dynamically adjusting the allocation of data based on the processing capabilities of each LLM, the routing engine can prevent bottlenecks and ensure efficient utilization of resources. Additionally, the routing engine may prioritize the routing of time-sensitive data to specific LLMs to meet performance requirements.

In some embodiments, the LLM input data 150 comprises non-confidential information. For example, the plurality of LLM input inspectors 240 may include a classifier input inspector. The classifier input inspector is responsible for determining that the LLM input data 150 may comprise the non-confidential information. Furthermore, the method involves routing the LLM input data 150. This routing is done to a public deployed large language model (LLM) based on the LLM input data 150 comprising non-confidential information. The method employs a routing engine for this purpose. The routing engine receives the non-confidential information and is responsible for routing the LLM input data 150 to the public deployed large language model (LLM). As an alternative, the routing engine could be designed to prioritize the routing of LLM input data 150 based on the sensitivity level of the information. For instance, the routing engine may have different routing rules for data classified as non-confidential compared to data classified as confidential. This dynamic routing mechanism ensures that non-confidential information is efficiently directed to the public deployed large language model (LLM) for processing.

In various embodiments, the dynamic routing mechanism determines that use cases should be handled by a specific LLM of the plurality of secure deployed large language models (LLMs). For example, coding may be most efficient on a specific LLM that is trained on source code of a user.

In some embodiments, the plurality of LLM input inspectors 240 may include a format validation inspector that verifies the structure and format of the LLM input data 150. The format validation inspector could check for compliance with predefined data formats or schemas to ensure that the input data is correctly formatted before being processed by the large language model.

In various embodiments, the administrative policy received through the administration communication interface 230 may include customizable rules for configuring the behavior of the LLM input inspectors 240. For example, the policy could specify thresholds for certain types of data validation or define exceptions for specific data sources, allowing for flexible and tailored control over the validation process.

According to various embodiments, the dynamically applying the plurality of LLM input inspectors 240 being in sequence for latency optimization and the dynamically applying the plurality of LLM output inspectors 250 being in sequence for latency optimization includes the dynamic application by prioritizing the execution of faster inspection algorithms before more computationally intensive ones. This sequential application strategy helps minimize processing delays while ensuring thorough validation of the LLM output data 160 before it is transmitted to the end user or application.

The computer-implemented method, as described above, may comprise an administration communication interface 230. The administration communication interface 230 further may comprise a dashboard interface. Additionally, the administration communication interface 230 may comprise one or more of the following: a policy engine, an observability engine, a compliance engine, an audit engine, a best practices engine, a logging engine, a risk scoring engine, a third-party application tracker, a recommendation engine, a reporting engine, or an alert engine. The dashboard interface may display real-time information on the status of the LLM input data 150 and LLM output data 160 flow, the performance of the LLM input inspectors 240 and LLM output inspectors 250, and any alerts or notifications generated by the system including logging. Furthermore, the administration communication interface 230 may incorporate various engines to enhance the functionality of the guardrail system. For instance, the policy engine can define and enforce the rules and guidelines for the LLM input inspectors 240 and the LLM output inspectors 250 based on the administrative policy. The observability engine may provide insights into the behavior and performance of the LLMs and inspectors, allowing administrators to identify any anomalies or issues in the data flow. Moreover, the compliance engine can ensure that the guardrails comply with regulatory requirements and industry standards. The audit engine may track and record all activities related to the guardrail system for auditing and compliance purposes. The best practices engine can suggest and implement best practices for configuring and optimizing the LLM input inspectors 240 and the LLM output inspectors 250. Additionally, the logging engine may maintain detailed logs of all data flow activities for troubleshooting and analysis. The risk scoring engine can assess the security risks associated with the LLM input and output data and provide risk scores to prioritize mitigation efforts. The third-party application tracker can monitor the interactions of third-party applications with the LLMs and inspectors. Furthermore, the recommendation engine may offer recommendations for improving the efficiency and security of the guardrail system. The reporting engine can generate comprehensive reports on the performance, compliance, and security posture of the guardrails. Lastly, the alert engine can send real-time alerts and notifications to administrators in case of any security incidents or policy violations.

Figure 3:
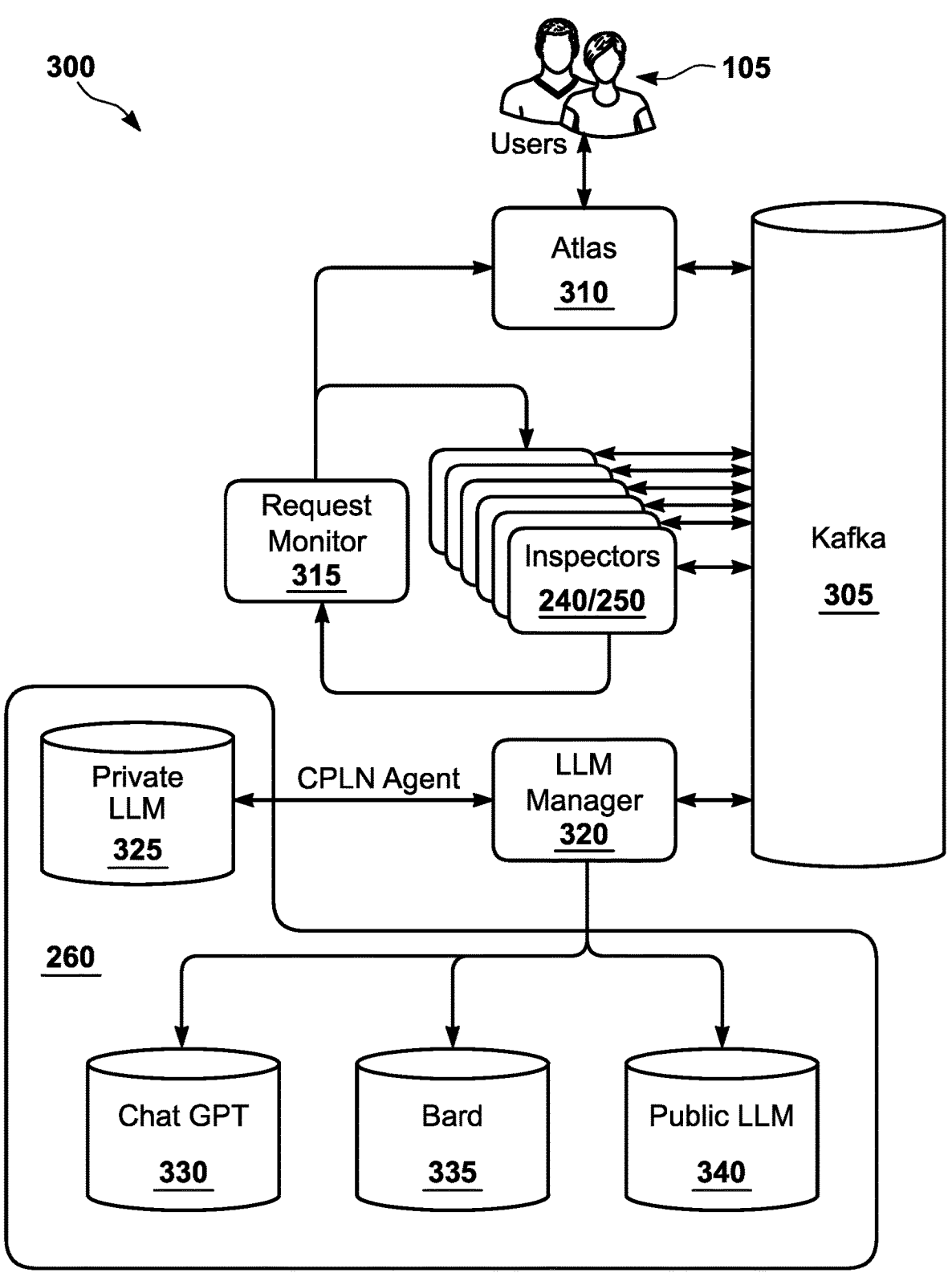
FIG. 3 shows a high-level block diagram of a request flow for dynamically applying a plurality of LLM input inspectors and dynamically applying a plurality of LLM output inspectors for securely using large language models (LLMs), according to embodiments of the present technology.

FIG. 3 shows a high-level block diagram of a request flow 300 for dynamically applying a plurality of LLM input inspectors 240 and dynamically applying a plurality of LLM output inspectors 250 for securely using large language models (LLMs), according to embodiments of the present technology. The request flow 300 shows a platform for handling real-time data feeds 305 (e.g., Kafka) coupled with the plurality of LLM input inspectors 240 and the plurality of LLM output inspectors 250. The request flow 300 includes Atlas 310 coupled with the end users 105 and a request monitor function 315. The request flow 300 further illustrates an LLM manager 320 using a CPLN agent for coupling with the plurality of secure deployed large language models (LLMs) 260, including a private LLM 325, ChatGPT 330, Bard 335, and a public LLM 340, for example.

According to various embodiments, the present technology, may comprise a plurality of LLM input inspectors 240. These LLM input inspectors 240 include binary input guardrails and modifying input guardrails. The modifying input guardrails are responsible for changing the LLM input data 150. The method also involves the dynamic application of the plurality of LLM input inspectors 240 in a specific sequence. This sequence may be a linear order, which comprises the step of first applying the binary input guard-rails in parallel. Following this, the method involves the step of secondly applying the modifying input guardrails. The second application of the modifying input guardrails is specifically for the purpose of latency optimization. For example, a multitude of binary input guardrails are dynami-cally applied simultaneously in parallel for efficiency. In contrast, if the binary input guardrails are dynamically applied linearly the processing time by the present technol-ogy would be increased.

In an alternative implementation, the sequence in which the LLM input inspectors 240 are applied can be customized based on the specific requirements of the system. For instance, if real-time processing is a priority, specific binary input guardrails may be given precedence over other binary input guardrails to minimize latency. This dynamic adjust-ment of the inspector sequence allows for flexibility in adapting to different use cases and operational needs without compromising on security or performance.

Various embodiments include a plurality of LLM output inspectors 250. These LLM output inspectors 250 comprise binary output guardrails and modifying output guardrails. The modifying output guardrails are responsible for chang-ing the LLM output data 160. The method also involves dynamically applying the plurality of LLM output inspectors 250 in sequence. The sequence in which these inspectors are applied may be a linear order. This linear order may com-prise first applying the binary output guardrails in parallel and then applying the modifying output guardrails. The application of the modifying output guardrails is specifically for latency optimization. The binary output guardrails are designed to ensure that the LLM output data 160 meets specific binary criteria or conditions set by the administra-tive policy. For example, the binary output guardrails may check if the LLM output data 160 contains sensitive infor-mation that should not be disclosed. On the other hand, the modifying output guardrails are responsible for making changes to the LLM output data 160 based on predefined rules or conditions. For instance, the modifying output guardrails may anonymize certain parts of the LLM output data 160 before it is released to the user or external system. This anonymization process could involve replacing identi-fiable information with generic placeholders to protect user privacy.

According to various embodiments, the dynamic appli-cation of the plurality of LLM output inspectors 250 in a linear order ensures that each inspector is applied in a specific sequence for optimal performance. For instance, the binary output guardrails may be applied first in parallel and simultaneously to quickly identify any violations of the binary criteria. Once the binary checks are completed, the modifying output guardrails may then be applied to make necessary modifications to the LLM output data 160 while considering latency optimization. As an example, consider a scenario where a large language model generates a text response that includes personal names and addresses. The binary output guardrails can first check if any sensitive personal information is present in the output. If any such information is detected, the modifying output guardrails can then anonymize the names and addresses before the final output is delivered to the user.

In some embodiments, the present technology involves the LLM input data 150 comprising a prompt. The method further may comprise the step of receiving one or more of the following from a classifier input inspector: an intention of the prompt, a request type of the prompt, a topic of the prompt, a subtopic of the prompt, a risk metric of the prompt, a risk type of the prompt, or a concern analysis of the prompt. Additionally, the method involves dynamically applying the plurality of LLM input inspectors 240 to the LLM input data 150. The dynamic application of these inspectors is further based on one or more of the following: the intention of the prompt, the request type of the prompt, the topic of the prompt, the subtopic of the prompt, the risk metric of the prompt, the risk type of the prompt, or the concern analysis of the prompt.

To illustrate this process, consider the first example: "request_type": "Information search", "topic": "Pass-words", "subtopic": "Retrieval", "intention": "The user is seeking to find and review previous passwords.". "risk_met-ric": "Medium", "risk_type": "Data Leakage", "concer-n_analysis": "This query may pose a risk as it involves accessing and potentially revealing sensitive information."

In contrast, to further illustrate this process, consider the second example: "request_type": "Information search", "topic": "Mathematics", "subtopic": "Square root", "inten-tion": "The user is seeking the answer to a mathematical question". "risk_metric": "None", "risk_type": "None", "concern_analysis": "No concerns detected".

According to some embodiments, to further illustrate this, let's consider an example where the prompt is a user query entered into a search engine. The classifier input inspector may receive various aspects of the prompt such as the intention behind the query (e.g., retrieval, informational), the type of request (e.g., search for a password, search for information), the main topic of the query (e.g., Passwords, Mathematics), any subtopics within the query (e.g., Retrieval, Square root), a risk metric associated with the query (e.g., potential security risks), the type of risk (e.g., privacy, security Data Leakage), or an analysis of any concerns related to the query.

In some embodiments, the dynamic application of the plurality of LLM input inspectors 240 to the LLM input data 150 can be based on any combination of the prompt aspects mentioned above. For instance, if the prompt is identified as having a high-risk metric related to privacy concerns, spe-cific LLM input inspectors 240 tailored to address privacy risks may be applied in sequence to ensure that the input data is validated and aligned with the administrative policy.

An alternative scenario could involve a prompt that is a voice command given to a virtual assistant. In this case, the classifier input inspector may analyze the intention of the command (e.g., setting a reminder, playing music), the type of request (e.g., scheduling, entertainment), the main topic of the command (e.g., calendar management, music prefer-ences), any subtopics within the command (e.g., specific dates, preferred genres), a risk metric associated with the command (e.g., potential data exposure risks), the type of risk (e.g., data leakage, unauthorized access), or an analysis of any concerns related to the command. The dynamic application of the LLM input inspectors 240 in this alter-native scenario may be based on the specific aspects of the voice command, ensuring that the input data is thoroughly inspected and validated according to the administrative policy in place.

Figure 4:
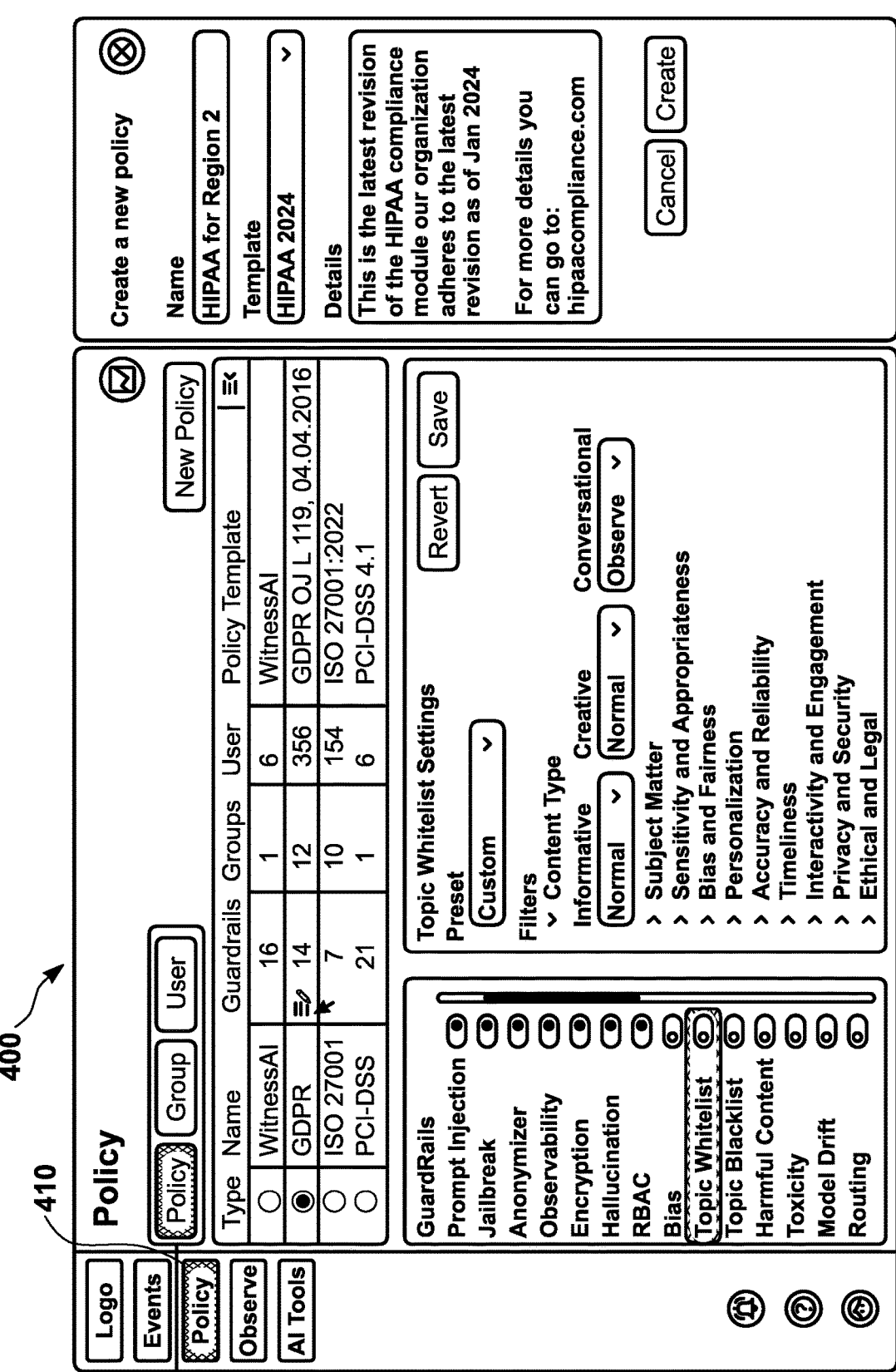
FIG. 4 illustrates an exemplary graphical user interface of an administration communication interface being configured for an administrative policy, according to embodiments of the present technology.

FIG. 4 illustrates an exemplary graphical user interface of an administration communication interface 400 being con-figured for an administrative policy 410, according to embodiments of the present technology. The administration communication interface 400 shows configuring the administrative policy 410.

Figure 5:
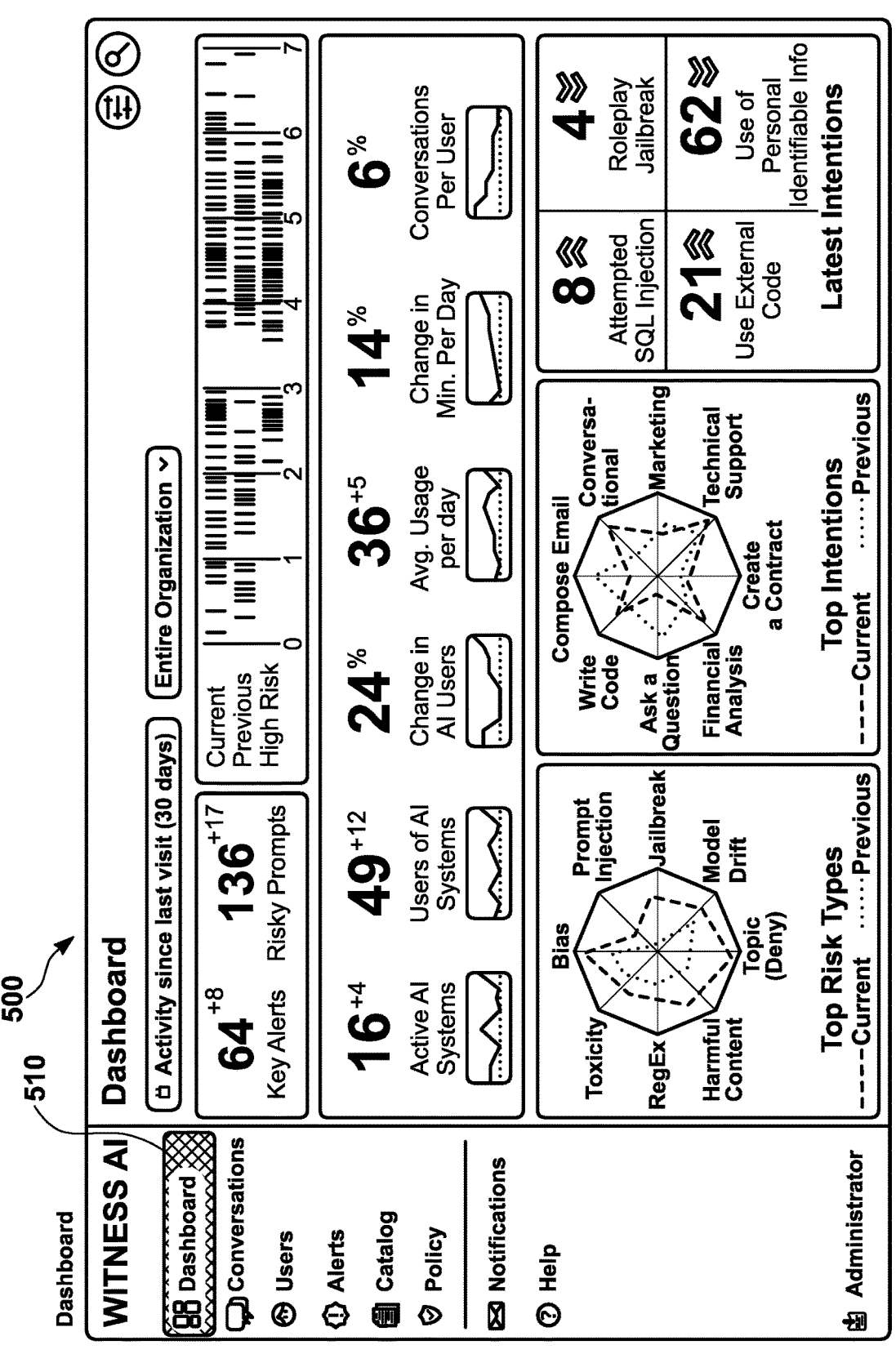
FIG. 5 illustrates an exemplary graphical user interface of an administration communication interface showing a dashboard including Artificial Intelligence (AI) tools detected and risk alerts, according to embodiments of the present technology.

FIG. 5 illustrates an exemplary graphical user interface of an administration communication interface 500 showing a dashboard 510 including Artificial Intelligence (AI) tools detected and risk alerts, according to embodiments of the present technology.

Figure 6:
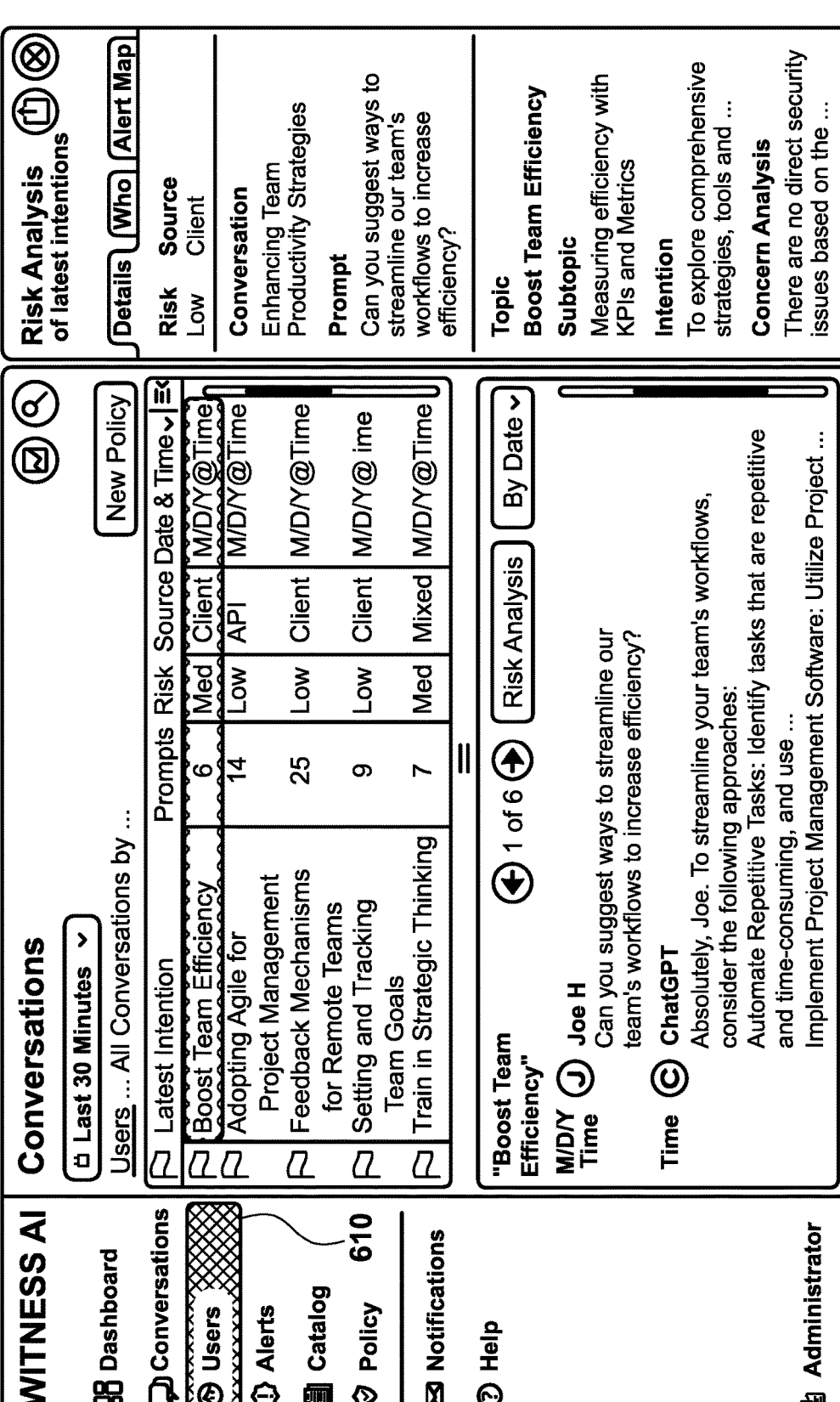
FIG. 6 illustrates an exemplary graphical user interface of an administration communication interface showing Artificial Intelligence (AI) activity including users and risk analysis, according to embodiments of the present technology.

FIG. 6 illustrates an exemplary graphical user interface of an administration communication interface 600 showing Artificial Intelligence (AI) activity including users 610 and risk analysis, according to embodiments of the present technology.

Figure 7:
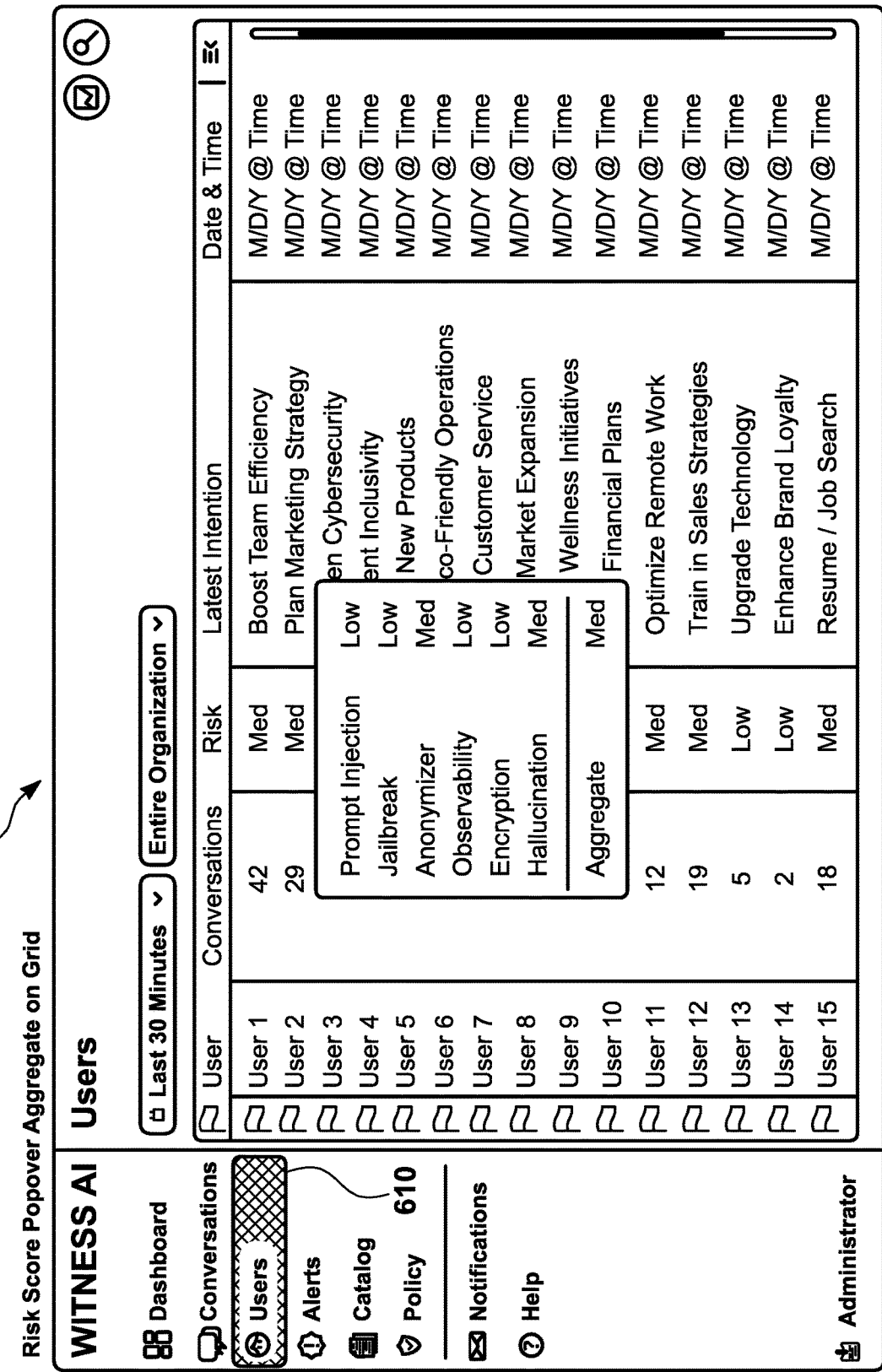
FIG. 7 illustrates an exemplary graphical user interface of an exemplary administration communication interface showing risk analysis of specific types of security vulnerabilities, according to embodiments of the present technology.

FIG. 7 illustrates an exemplary graphical user interface of an administration communication interface 700 showing risk analysis of specific types of security vulnerabilities, according to embodiments of the present technology. For example, the administration communication interface 700 displays a risk of users 610 including a latest intention of each of the users 610.

FIG. 8 depicts a process flow diagram showing a method for guardrails for securely using large language models (LLMs) using an administrative policy, according to embodiments of the present technology. FIG. 8 is an example method of guardrails for securely using large language models (LLMs), the computer-implemented method comprising the following operations.

At step 810, monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data.

At step 820, receiving an administrative policy from an administration communication interface.

At step 830, dynamically applying a plurality of LLM input inspectors to the LLM input data based on the administrative policy, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy.

At step 840, dynamically applying a plurality of LLM output inspectors to the LLM output data based on the administrative policy, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy.

FIG. 9 depicts a process flow diagram showing a method for guardrails for securely using large language models (LLMs) using an administrative policy and an intention of the prompt, according to embodiments of the present technology. FIG. 9 is an example method of guardrails for securely using large language models (LLMs), the computer-implemented method comprising the following operations.

At step 910, monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data, the LLM input data comprising a prompt.

At step 920, receiving an administrative policy from an administration communication interface.

At step 930, receiving an intention of the prompt from a classifier input inspector.

At step 940, dynamically applying a plurality of LLM input inspectors to the LLM input data based on the administrative policy and the intention of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt.

At step 950, dynamically applying a plurality of LLM output inspectors to the LLM output data based on the administrative policy and the intention of the prompt, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt.

FIG. 10 depicts a process flow diagram showing a method for guardrails for securely using large language models (LLMs) using an intention of the prompt and a classifier input inspector, according to embodiments of the present technology. FIG. 10 is an example method for A computer-implemented method of guardrails for securely using large language models (LLMs), the computer-implemented method comprising the following operations.

At step 1010, monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data, the LLM input data comprising a prompt.

At step 1020, receiving an administrative policy from an administration communication interface.

At step 1030, receiving one or more of: an intention of the prompt, a request type of the prompt, a topic of the prompt, a subtopic of the prompt, a risk metric of the prompt, a risk type of the prompt, or a concern analysis of the prompt from a classifier input inspector.

At step 1040, dynamically applying a plurality of LLM input inspectors to the LLM input data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM input inspectors being in sequence for latency optimization, the plurality of LLM input inspectors being LLM input guardrails for a plurality of secure deployed large language models (LLMs), the plurality of LLM input inspectors being configured by the administrative policy and validating the LLM input data to validated LLM input data based on the administrative policy and the intention of the prompt.

At step 1050, dynamically applying a plurality of LLM output inspectors to the LLM output data based on the administrative policy and the one or more of: the intention of the prompt, the request type of the prompt, the topic of the prompt, the subtopic of the prompt, the risk metric of the prompt, the risk type of the prompt, or the concern analysis of the prompt, the dynamically applying the plurality of LLM output inspectors being in sequence for latency optimization, the plurality of LLM output inspectors being LLM output guardrails for the plurality of secure deployed large language models (LLMs), the plurality of LLM output inspectors being configured by the administrative policy and validating the LLM output data to validated LLM output data based on the administrative policy and the intention of the prompt.

According to various embodiments, the present disclosure relates to a computer-implemented method of guardrails for securely using large language models (LLMs). The method may comprise monitoring user data flow using an application programming interface (API). The application programming interface (API) receives data from one or more of the following sources: a proxy, a client, a connector, an agent, a third-party application, a browser plug-in, or a device. The user data flow may comprise LLM input data 150 and LLM output data 160, with the LLM input data 150 further comprising a prompt. The method also involves receiving an administrative policy from an administration communication interface. In addition, the method may include receiving an intention of the prompt from a classifier input inspector. The method further may comprise dynamically applying a plurality of LLM input inspectors 240 to the LLM input data 150. The dynamic application of the plurality of LLM input inspectors 240 is based on the administrative policy and the intention of the prompt. The dynamic application of the plurality of LLM input inspectors 240 is in sequence for latency optimization. The plurality of LLM input inspectors 240 serve as LLM input guardrails for a plurality of secure deployed large language models (LLMs) 260. The plurality of LLM input inspectors 240 are configured by the administrative policy and validate the LLM input data 150 to validated LLM input data based on the administrative policy and the intention of the prompt. Moreover, the method involves dynamically applying a plurality of LLM output inspectors 250 to the LLM output data 160. The dynamic application of the plurality of LLM output inspectors 250 is based on the administrative policy and the intention of the prompt. The dynamic application of the plurality of LLM output inspectors 250 is in sequence for latency optimization. The plurality of LLM output inspectors 250 serve as LLM output guardrails for the plurality of secure deployed large language models (LLMs) 260. The plurality of LLM output inspectors 250 are configured by the administrative policy and validate the LLM output data 160 to validated LLM output data based on the administrative policy and the intention of the prompt. These LLM input inspectors 240 are designed to validate and ensure the security of the input data based on the administrative policy and the intention of the prompt. For example, one LLM input inspector may be a syntax checker that verifies the structure and syntax of the prompt to prevent any malicious code injection attempts. Another inspector may be a context analyzer that evaluates the context of the prompt to ensure it aligns with the intended use of the LLM. Additionally, a data origin validator may be implemented to confirm the authenticity and integrity of the data sources.

Some embodiments include the dynamic application of a series of LLM output inspectors 250 to the LLM output data

160. These LLM output inspectors 250 are responsible for validating the output data to ensure it complies with the administrative policy and the intention of the prompt. For instance, an output sentiment analyzer may be utilized to assess the emotional tone of the generated text to filter out any potentially harmful or inappropriate content. Another inspector may be a relevance checker that verifies the output data is relevant to the prompt provided. Moreover, a data format validator may be employed to confirm the output data is in the correct format for the intended use. Alternative embodiments of the method may involve the use of machine learning algorithms to continuously adapt and improve the LLM input inspectors 240 and LLM output inspectors 250 based on real-time feedback and evolving security threats.

Embodiments include a computer-implemented method of guardrails for securely using large language models (LLMs). The method may comprise monitoring user data flow using an application programming interface (API). The application programming interface (API) receives data from one or more of the following sources: a proxy, a client, a connector, an agent, a third-party application, a browser plug-in, or a device. The user data flow may comprise LLM input data 150 and LLM output data 160, with the LLM input data 150 including a prompt. The method further may comprise receiving an administrative policy from an administration communication interface. Additionally, the method involves receiving one or more of the following from a classifier input inspector: an intention of the prompt, a request type of the prompt, a topic of the prompt, a subtopic of the prompt, a risk metric of the prompt, a risk type of the prompt, or a concern analysis of the prompt. The method also may include dynamically applying a plurality of LLM input inspectors 240 to the LLM input data 150. This dynamic application is based on the administrative policy and the one or more of the following: the intention of the prompt, the request type of the prompt, the topic of the prompt, the subtopic of the prompt, the risk metric of the prompt, the risk type of the prompt, or the concern analysis of the prompt. The dynamic application of the plurality of LLM input inspectors 240 is in sequence for latency optimization. The plurality of LLM input inspectors 240 serve as LLM input guardrails for a plurality of secure deployed large language models (LLMs) 260. The plurality of LLM input inspectors 240 are configured by the administrative policy and validate the LLM input data 150 to validated LLM input data based on the administrative policy and the intention of the prompt. Furthermore, the method may comprise dynamically applying a plurality of LLM output inspectors 250 to the LLM output data 160. This dynamic application is based on the administrative policy and the one or more of the following: the intention of the prompt, the request type of the prompt, the topic of the prompt, the subtopic of the prompt, the risk metric of the prompt, the risk type of the prompt, or the concern analysis of the prompt. The dynamic application of the plurality of LLM output inspectors 250 is in sequence for latency optimization. The plurality of LLM output inspectors 250 serve as LLM output guardrails for the plurality of secure deployed large language models (LLMs) 260. The plurality of LLM output inspectors 250 are configured by the administrative policy and validate the LLM output data 160 to validated LLM output data based on the administrative policy and the intention of the prompt.

According to various embodiments, the LLM input inspectors 240 act as guardrails for the secure use of large language models (LLMs) by validating the input data based on various parameters such as the intention of the prompt, request type, topic, subtopic, risk metric, risk type, and concern analysis. The sequence in which these inspectors are applied is optimized for latency considerations. For example, if the intention of the prompt is to generate a response related to a sensitive topic, the LLM input inspectors 240 may include a specific inspector designed to flag and handle such sensitive content appropriately. As an illustration, consider a scenario where a user inputs a prompt requesting information on a confidential project. The LLM input inspectors 240, based on the administrative policy and the nature of the prompt, may first check for any keywords or phrases indicative of sensitive information. Subsequently, another inspector could analyze the risk metric associated with the prompt to determine the level of scrutiny required. If the risk metric is high, additional validation steps may be triggered to ensure that the output generated by the LLM does not disclose any confidential details.

According to various embodiments, the present technology compasses the dynamic application of a plurality of LLM output inspectors 250 to the LLM output data 160. These LLM output inspectors 250 serve as guardrails by validating the output data based on parameters similar to those considered for the input data. By analyzing the intention of the prompt, request type, topic, subtopic, risk metric, risk type, and concern analysis, the LLM output inspectors 250 ensure that the generated responses align with the specified criteria and do not pose any security risks. For instance, if the prompt involves a request for financial projections, the LLM output inspectors 250 may first verify the accuracy of the data provided in the response. Subsequently, based on the risk type associated with financial information, additional inspectors could be activated to perform a thorough validation of the output to prevent any inadvertent disclosure of sensitive financial data.

Various embodiments may comprise one or more of the following actions. The method may involve generating a warning. Additionally, the method may include logging. Furthermore, the method may comprise calling a third-party application programming interface (API). The execution of these actions is based on the validation of the LLM output data 160. For example, if the risk metric of the prompt exceeds a certain threshold as determined by the risk type, a warning message can be generated to alert the user or administrator about the potential risk associated with the LLM output data 160. Moreover, the method may include logging all interactions and decisions made during the validation process. This logging mechanism can capture details such as which LLM input inspectors 240 were applied, the results of each inspection, and the final validated LLM input data. By maintaining a comprehensive log, users can track the validation steps taken and review them for auditing or troubleshooting purposes. Additionally, the method may involve calling a third-party application programming interface (API) to perform specific actions based on the validated LLM output data. For instance, if the LLM output data 160 is validated and approved, the method could trigger the third-party API to initiate a follow-up process or integrate the validated data into another system for further analysis or processing.

FIG. 11A and FIG. 11B illustrate an exemplary graphical user interface of an administration communication interface 1100 showing risk analysis, according to embodiments of the present technology. For example, the administration communication interface 1100 shows alerts 1110. FIG. 11B shows a risk analysis 1120 of the latest intentions of a user.

FIG. 12A and FIG. 12B illustrate an exemplary graphical user interface of an administration communication interface 1200 showing logging of Artificial Intelligence (AI) activity, according to embodiments of the present technology. For example, the administration communication interface 1200 includes a catalog 1210 of AI activity. FIG. 12B shows an information panel 1220 with detailed attributes of a selected AI application.

Figure 13:
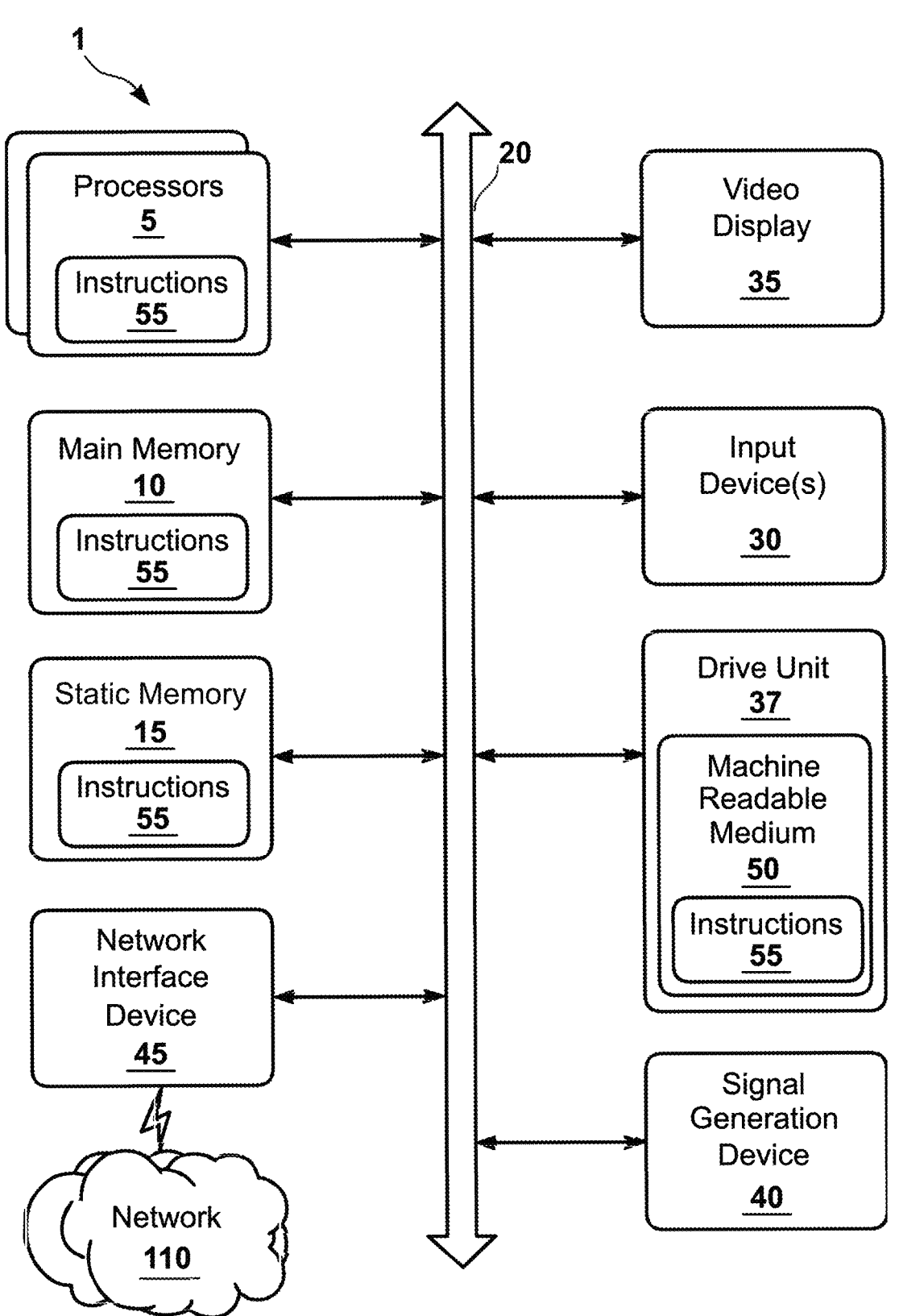
FIG. 13 illustrates an exemplary computer system that may be used to implement guardrails for securely using large language models (LLMs), according to embodiments of the present technology.

FIG. 13 illustrates an exemplary computer system that may be used to implement guardrails for securely using large language models (LLMs), according to embodiments of the present technology. FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on,"

"connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

Thus, the technology of guardrails for securing the use of large language models (LLMs) is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method of guardrails for securely using large language models (LLMs), the computer-implemented method comprising:

monitoring user data flow using an application programming interface (API) that intercepts network communications before reaching external LLM services, the application programming interface (API) receiving data from one or more of: a proxy, a client, a connector, an agent, a third-party application, a browser plug-in, or a device, the user data flow comprising LLM input data and LLM output data;

receiving an administrative policy from an administration communication interface;

executing a plurality of LLM input inspectors to the LLM input data based on the administrative policy, the plurality of LLM input inspectors comprising binary input guardrails and modifying input guardrails, the modifying input guardrails changing the LLM input data, the executing the plurality of LLM input inspectors being performed in a linear order comprising first applying the binary input guardrails in parallel and second applying the modifying input guardrails for latency optimization, the plurality of LLM input inspectors being LLM input guardrails for a plurality of secure deployed large language models (LLMs) comprising LLMs deployed with access controls and data encryption, the plurality of LLM input inspectors being configured by the administrative policy and validating the LLM input data based on the administrative policy, the validating comprising determining the LLM input data complies with the administrative policy;

analyzing the LLM input data using the plurality of LLM input inspectors;

determining the LLM input data violates an LLM input setting of the administrative policy based on the analyzing the LLM input data using the plurality of LLM input inspectors;

blocking the LLM input data from processing by the plurality of secure deployed large language models (LLMs) based on the determining the LLM input data violates the LLM input setting of the administrative policy;

executing a plurality of LLM output inspectors to the LLM output data based on the administrative policy, the plurality of LLM output inspectors comprising binary output guardrails and modifying output guardrails, the modifying output guardrails changing the LLM output data, the executing the plurality of LLM output inspectors being performed in a linear order comprising first applying the binary output guardrails in parallel and second applying the modifying output guardrails for latency optimization, the plurality of LLM output inspectors being LLM output guardrails for the plurality of secure deployed large language models (LLMs), the plurality of LLM output inspectors being configured by the administrative policy and validating the LLM output data based on the administrative policy, the validating comprising determining the LLM output data complies with the administrative policy;

analyzing the LLM output data using the plurality of LLM output inspectors;

determining the LLM output data violates an LLM output setting of the administrative policy based on the analyzing the LLM output data using the plurality of LLM output inspectors; and blocking the LLM output data based on the determining the LLM output data violates the LLM output setting of the administrative policy.

2. The computer-implemented method of claim 1, wherein the plurality of LLM input inspectors comprise one or more of: a prompt injection filter, a model drift filter, a Personally Identifiable Information (PII) redacting filter, a banned topics filter, a banned string filter, a bias filter, a source code filter, a toxicity filter, a source tagging filter, a use cases filter, a token count filter, an encryption filter, a security filter, an API filter, or a third-party developed filter.

3. The computer-implemented method of claim 1, wherein the plurality of LLM output inspectors comprise one or more of: a hallucination filter, a prompt injection filter, a malicious URLs filter, a source code filter, a model drift filter, a refutation filter, a Personally Identifiable Information (PII) un-redacting filter, a banned topics filter, an on topic filter, an allowed topics filter, a banned string filter, a bias filter, a toxicity filter, a source tagging filter, a use cases filter, a token count filter, an encryption filter, a relevance filter, an anonymization filter, a sentiment filter, an access control filter, a regex filter, a decryption filter, or a third-party developed filter.

4. The computer-implemented method of claim 1, wherein the LLM input data comprises Personally Identifiable Information (PII);

wherein the plurality of LLM input inspectors comprise a PII redacting filter configured to redact the PII by replacing it with a tag before processing by the plurality of secure deployed LLMs; and wherein the plurality of LLM output inspectors comprise a Personally Identifiable Information (PII) un-redacting filter, the Personally Identifiable Information (PII) un-redacting filter un-redacting the Personally Identifiable Information (PII) after the processing of the redacted Personally Identifiable Information (PII) by the plurality of secure deployed large language models (LLMs), the un-redacting replacing the tag with the Personally Identifiable Information (PII).

5. The computer-implemented method of claim 1,
wherein the LLM input data comprises a prompt; and
wherein the plurality of LLM input inspectors comprise a
classifier input inspector, the classifier input inspector
determining an intention of a prompt.

6. The computer-implemented method of claim 5, further
comprising:
routing the LLM input data to an approved secure
deployed LLM of the plurality of secure deployed
LLMs using a routing engine, the routing engine
receiving the intention of the prompt and routing the
LLM input data to the approved secure deployed LLM
based on the intention of the prompt.

7. The computer-implemented method of claim 5, further
comprising:
determining a security risk score for the prompt;
comparing the security risk score for the prompt to a
security threshold; and
performing an action on the LLM input data based on the
comparing the security risk score for the prompt to the
security threshold.

8. The computer-implemented method of claim 7,
wherein the performing the action on the LLM input data
comprises one or more of:
blocking the LLM input data from processing by the
plurality of secure deployed large language models
(LLMs);
allowing the LLM input data for processing by the
plurality of secure deployed large language models
(LLMs); and
generating a warning, logging, or
calling a third-party application programming interface
(API).

9. The computer-implemented method of claim 1,
wherein the LLM input data comprises one of confidential
information or non-confidential information;
wherein the plurality of LLM input inspectors comprise a
classifier input inspector, the classifier input inspector
determining whether the LLM input data comprises the
confidential information or the non-confidential infor-
mation; and
routing the LLM input data using a routing engine to:
(i) a private secure deployed large language model (LLM)
of the plurality of secure deployed large language
models (LLMs) when the LLM input data comprises
confidential information, or
(ii) a public deployed large language model (LLM) of the
plurality of secure deployed large language models
(LLMs) when the LLM input data comprises non-
confidential information,
wherein the routing engine receives the determination
from the classifier input inspector.

10. The computer-implemented method of claim 1,
wherein the plurality of LLM input inspectors are applied
to the LLM input data to provide metadata regarding
the LLM input data, and the metadata comprising one
or more of: a request type, a topic, a subtopic, an
intention, a risk metric, a risk type, or a concern
analysis.

11. The computer-implemented method of claim 1,
wherein the administration communication interface com-
prises a dashboard interface and one or more of: a
policy engine, an observability engine, a compliance
engine, an audit engine, a best practices engine, a
logging engine, a risk scoring engine, a third-party
application tracker, a recommendation engine, a report-
ing engine, or an alert engine.

12. The computer-implemented method of claim 1,
wherein the LLM input data comprises a prompt, further
comprising receiving one or more of: an intention of
the prompt, a request type of the prompt, a topic of the
prompt, a subtopic of the prompt, a risk metric of the
prompt, a risk type of the prompt, or a concern analysis
of the prompt from a classifier input inspector;
wherein the executing the plurality of LLM input inspec-
tors to the LLM input data is further based on the one
or more of: the intention of the prompt, the request type
of the prompt, the topic of the prompt, the subtopic of
the prompt, the risk metric of the prompt, the risk type
of the prompt, or the concern analysis of the prompt.

13. A computer-implemented method of guardrails for
securely using large language models (LLMs), the com-
puter-implemented method comprising:
monitoring user data flow using an application program-
ming interface (API) that intercepts network commu-
nications before reaching external LLM services, the
application programming interface (API) receiving
data from one or more of: a proxy, a client, a connector,
an agent, a third-party application, a browser plug-in,
or a device, the user data flow comprising LLM input
data and LLM output data, the LLM input data com-
prising a prompt;
receiving an administrative policy from an administration
communication interface;
receiving from a classifier input inspector one or more of:
an intention of the prompt, a request type of the prompt,
a topic of the prompt, a subtopic of the prompt, a risk
metric of the prompt, a risk type of the prompt, or a
concern analysis of the prompt, the intention compris-
ing one or more of: information retrieval, code genera-
tion, content creation, data analysis, question answer-
ing, or document summarization, and the risk metric
being a numerical value calculated based on factors
comprising presence of injection patterns, toxicity
level, banned topic detection, and personally identifi-
able information content;
executing a plurality of LLM input inspectors to the LLM
input data based on the administrative policy and the
one or more of: the intention of the prompt, the request
type of the prompt, the topic of the prompt, the subtopic
of the prompt, the risk metric of the prompt, the risk
type of the prompt, or the concern analysis of the
prompt, the plurality of LLM input inspectors compris-
ing binary input guardrails and modifying input guard-
rails, the modifying input guardrails changing the LLM
input data, the executing the plurality of LLM input
inspectors being performed in a linear order comprising
first applying the binary input guardrails in parallel and
second applying the modifying input guardrails for
latency optimization, the plurality of LLM input
inspectors being LLM input guardrails for a plurality of
secure deployed large language models (LLMs) com-
prising LLMs deployed with access controls and data
encryption, the plurality of LLM input inspectors being
configured by the administrative policy and validating
the LLM input data based on the administrative policy
and the intention of the prompt, the validating com-
prising determining the LLM input data complies with
the administrative policy;
analyzing the LLM input data using the plurality of LLM
input inspectors;

determining the LLM input data violates an LLM input setting of the administrative policy based on the analyzing the LLM input data using the plurality of LLM input inspectors;

blocking the LLM input data from processing by the plurality of secure deployed large language models (LLMs) based on the determining the LLM input data violates the LLM input setting of the administrative policy;

executing a plurality of LLM output inspectors to the LLM output data based on the administrative policy and the one or more of: the intention of the prompt, the request type of the prompt, the topic of the prompt, the subtopic of the prompt, the risk metric of the prompt, the risk type of the prompt, or the concern analysis of the prompt, the plurality of LLM output inspectors comprising binary output guardrails and modifying output guardrails, the modifying output guardrails changing the LLM output data, the executing the plurality of LLM output inspectors being performed in a linear order comprising first applying the binary output guardrails in parallel and second applying the modifying output guardrails for latency optimization, the plurality of LLM output inspectors being LLM output guardrails for the plurality of secure deployed large language models (LLMs), the plurality of LLM output inspectors being configured by the administrative policy and validating the LLM output data based on the administrative policy and the intention of the prompt, the validating comprising determining the LLM output data complies with the administrative policy;

analyzing the LLM output data using the plurality of LLM output inspectors;

determining the LLM output data violates an LLM output setting of the administrative policy based on the analyzing the LLM output data using the plurality of LLM output inspectors; and blocking the LLM output data based on the determining the LLM output data violates the LLM output setting of the administrative policy.

14. A computer-implemented method of guardrails for securely using large language models (LLMs), the computer-implemented method comprising:

monitoring user data flow using an application programming interface (API), the application programming interface (API) receiving data from one or more of: a proxy, a client, a connector, an agent, a third-party application, a browser plug-in, or a device, the user data flow comprising LLM input data and LLM output data, the LLM input data comprising a prompt;

receiving an administrative policy from an administration communication interface;

receiving from a classifier input inspector one or more of: an intention of the prompt, a request type of the prompt, a topic of the prompt, a subtopic of the prompt, a risk metric of the prompt, a risk type of the prompt, or a concern analysis of the prompt;

executing a plurality of LLM input inspectors to the LLM input data based on the administrative policy and the one or more of: the intention of the prompt, the request type of the prompt, the topic of the prompt, the subtopic of the prompt, the risk metric of the prompt, the risk type of the prompt, or the concern analysis of the prompt, the plurality of LLM input inspectors comprising binary input guardrails and modifying input guardrails, the modifying input guardrails changing the LLM input data, the executing the plurality of LLM input inspectors being performed in a linear order comprising first applying the binary input guardrails in parallel and second applying the modifying input guardrails for latency optimization, the plurality of LLM input inspectors being LLM input guardrails for a plurality of secure deployed large language models (LLMs) comprising LLMs deployed with access controls and data encryption, the plurality of LLM input inspectors being configured by the administrative policy and validating the LLM input data based on the administrative policy and the intention of the prompt, the validating comprising determining the LLM input data complies with the administrative policy;

analyzing the LLM input data using the plurality of LLM input inspectors;

determining the LLM input data violates an LLM input setting of the administrative policy based on the analyzing the LLM input data using the plurality of LLM input inspectors;

blocking the LLM input data from processing by the plurality of secure deployed large language models (LLMs) based on the determining the LLM input data violates the LLM input setting of the administrative policy;

executing a plurality of LLM output inspectors to the LLM output data based on the administrative policy and the one or more of: the intention of the prompt, the request type of the prompt, the topic of the prompt, the subtopic of the prompt, the risk metric of the prompt, the risk type of the prompt, or the concern analysis of the prompt, the plurality of LLM output inspectors comprising binary output guardrails and modifying output guardrails, the modifying output guardrails changing the LLM output data, the executing the plurality of LLM output inspectors being performed in a linear order comprising first applying the binary output guardrails in parallel and second applying the modifying output guardrails for latency optimization, the plurality of LLM output inspectors being LLM output guardrails for the plurality of secure deployed large language models (LLMs), the plurality of LLM output inspectors being configured by the administrative policy and validating the LLM output data based on the administrative policy and the intention of the prompt, the validating comprising determining the LLM output data complies with the administrative policy;

analyzing the LLM output data using the plurality of LLM output inspectors;

determining the LLM output data violates an LLM output setting of the administrative policy based on the analyzing the LLM output data using the plurality of LLM output inspectors; and blocking the LLM output data based on the determining the LLM output data violates the LLM output setting of the administrative policy.

15. The computer-implemented method of claim 1, further comprising one or more of: generating a warning, logging, or calling a third-party application programming interface (API) based on the validating the LLM output data.

* * * * *